US011872985B2

(12) United States Patent
Han et al.

(10) Patent No.: US 11,872,985 B2
(45) Date of Patent: Jan. 16, 2024

(54) DETERMINING A SETTING FOR A CRUISE CONTROL

(71) Applicant: Toyota Motor Engineering & Manufacturing North America, Inc., Plano, TX (US)

(72) Inventors: Kyungtae Han, Palo Alto, CA (US); Ziran Wang, San Jose, CA (US); Prashant Tiwari, Santa Clara, CA (US); John K Lenneman, Okemos, MI (US); Toshinori Esaka, Ann Arbor, MI (US); Miles J. Johnson, Ann Arbor, MI (US); Chase C. Violetta, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 104 days.

(21) Appl. No.: 17/216,924

(22) Filed: Mar. 30, 2021

(65) Prior Publication Data

US 2022/0314990 A1 Oct. 6, 2022

(51) Int. Cl.
*B60W 30/16* (2020.01)
*B60W 40/08* (2012.01)
(Continued)

(52) U.S. Cl.
CPC ...... *B60W 30/162* (2013.01); *B60W 30/1882* (2013.01); *B60W 40/08* (2013.01);
(Continued)

(58) Field of Classification Search
CPC .......... B60W 30/162; B60W 30/1882; B60W 40/02; B60W 40/08; B60W 50/00;
(Continued)

(56) References Cited

U.S. PATENT DOCUMENTS 8,509,987 B2 8/2013 Resner
8,612,107 B2 12/2013 Malikopoulos
(Continued)

FOREIGN PATENT DOCUMENTS

CN 109624986 A 4/2019

OTHER PUBLICATIONS

Xiong et al., "Drivers' Adaptation to Adaptive Cruise Control: Examination of Automatic and Manual Braking", IEEE Transactions on Intelligent Transportation Systems, vol. 13, No. 3, pp. 1468-1473, 2012.

(Continued)

*Primary Examiner* — Dale W Hilgendorf
*Assistant Examiner* — Hana Lee
(74) *Attorney, Agent, or Firm* — Christopher G. Darrow; Darrow Mustafa PC

(57) ABSTRACT

Based on a model and an identity of an operator of a vehicle, a setting for a cruise control to maintain a distance between the vehicle and a preceding vehicle can be determined. The model can be based on historical distances maintained by the operator. The model can also be based on information about an environment in which the vehicle is operating or information about a state of the operator. The identity can be received from an interface configured to receive information associated with the identity, a cloud computing platform, or a biometric system configured to determine the identity. The cruise control can be caused to operate according to the setting. A rate of energy consumption by the vehicle when the vehicle is controlled by the cruise control can be less than the rate of energy consumption when the vehicle lacks being controlled by the cruise control.

23 Claims, 9 Drawing Sheets

| | Name | Residence | Time | Speed | Weather | Visibility | Temperature | Road Condition | Road Type | Lane Number | Lane Type | Preceding Type | Traffic |
|---|---|---|---|---|---|---|---|---|---|---|---|---|---|
| 440 | Alice Alpha | Minneapolis | 1930 | 30 mph | precipitation | poor | 30°F | wet | arterial | 1 | travel | car | heavy |
| 442 | Alice Alpha | Minneapolis | 1200 | 55 mph | sunny | good | 50°F | dry | freeway | 2 | travel | truck | light |
| 444 | Bob Bravo | Los Angeles | 0915 | 35 mph | sunny | good | 70°F | dry | arterial | 1 | turn | car | heavy |
| 446 | Bob Bravo | Los Angeles | 1730 | 75 mph | sunny | good | 80°F | dry | freeway | 1 | travel | truck | heavy |
| 448 | Carol Charles | Green Bay | 2000 | 70 mph | sunny | good | 20°F | dry | freeway | 2 | travel | car | light |
| 450 | Carol Charles | Green Bay | 0830 | 65 mph | precipitation | poor | 40°F | wet | freeway | 3 | travel | truck | heavy |
| 452 | Dave Delta | Minneapolis | 1000 | 50 mph | precipitation | good | 30°F | dry | freeway | 1 | travel | car | light |
| 454 | Dave Delta | Minneapolis | 1300 | 30 mph | sunny | good | 70°F | dry | arterial | 2 | travel | car | light |
| 456 | Ellen Echo | Buffalo | 1630 | 50 mph | precipitation | good | 30°F | wet | freeway | 3 | travel | truck | heavy |
| 458 | Ellen Echo | Buffalo | 1130 | 30 mph | precipitation | poor | 40°F | wet | arterial | 1 | turn | car | light |
| 460 | Frank Foxtrot | Miami | 1500 | 40 mph | sunny | good | 80°F | wet | arterial | 1 | turn | truck | heavy |
| 462 | Frank Foxtrot | Miami | 1400 | 70 mph | precipitation | good | 90°F | wet | freeway | 2 | travel | car | light |

(51) Int. Cl.
  *B60W 50/00* (2006.01)
  *B60W 30/188* (2012.01)
  *G06V 20/59* (2022.01)
  *B60W 40/02* (2006.01)

(52) U.S. Cl.
  CPC .......... *B60W 50/00* (2013.01); *G06V 20/597* (2022.01); *B60W 40/02* (2013.01); *B60W 2040/0809* (2013.01); *B60W 2040/0827* (2013.01); *B60W 2040/0872* (2013.01); *B60W 2050/0075* (2013.01); *B60W 2050/0083* (2013.01); *B60W 2540/22* (2013.01); *B60W 2540/221* (2020.02); *B60W 2540/229* (2020.02); *B60W 2552/05* (2020.02); *B60W 2552/10* (2020.02); *B60W 2552/35* (2020.02); *B60W 2552/53* (2020.02); *B60W 2555/20* (2020.02); *B60W 2556/10* (2020.02)

(58) Field of Classification Search
  CPC ......... B60W 2556/10; B60W 2552/35; B60W 2552/53; B60W 2555/20; B60W 2540/229; B60W 2540/221; B60W 2552/05; B60W 2552/10; B60W 2040/0809; B60W 2040/0827; B60W 2040/0872; B60W 2050/0075; B60W 2050/0083; B60W 2540/22; G06V 20/597
  See application file for complete search history.

(56) References Cited

U.S. PATENT DOCUMENTS

| | | |
|---|---|---|
| 9,969,393 B2 | 5/2018 | Rebhan et al. |
| 2004/0193353 A1* | 9/2004 | Dunoyer ............ B60K 31/0008 180/170 |
| 2014/0200788 A1* | 7/2014 | Eriksson ................ B60K 26/00 701/93 |
| 2015/0220068 A1* | 8/2015 | Goldman-Shenhar ...................... G05B 13/0265 700/47 |
| 2016/0047662 A1 | 2/2016 | Ricci |
| 2017/0015318 A1* | 1/2017 | Scofield ............... G08G 1/0129 |
| 2017/0052540 A1* | 2/2017 | Lokesh ............... B60W 30/165 |
| 2018/0105186 A1* | 4/2018 | Motomura ........... B60W 50/14 |
| 2018/0285665 A1* | 10/2018 | Paszkowicz ...... B60W 50/0098 |
| 2020/0079385 A1* | 3/2020 | Beaurepaire ......... G05D 1/0212 |
| 2020/0086873 A1* | 3/2020 | Tahmasbi-Sarvestani ................... G08G 1/16 |
| 2020/0324765 A1* | 10/2020 | Lanfranco ............. B60W 30/16 |

OTHER PUBLICATIONS

Wenjie Yin, "Machine Learning for Adaptive Cruise Control Target Selection," TRITA-EECS-EX, Stockholm, Sweden, pp. 1-52, 2019.
Kanjee et al., "Vision-Based Adaptive Cruise Control Using Pattern Matching", 2013 6th Robotics and Mechatronics Conference (RobMech), Durban, pp. 93-98, 2013.
Wei et al., "End-to-End Vision-Based Adaptive Cruise Control (ACC) Using Deep Reinforcement Learning", 99th Transportation Research Board Annual Meeting, Washington D.C., Jan. 24, 2020.
Aksjonov et al., "A Novel Driver Performance Model Based on Machine Learning", IFAC-PapersOnLine, vol. 51, No. 9, pp. 267-272, 2018.
Fugiglando et al., "Driving Behavior Analysis through CAN Bus Data in an Uncontrolled Environment", IEEE Transactions on Intelligent Transportation Systems, vol. 20, No. 2, pp. 737-748, Feb. 2019.
Unknown, "Cruise control," found at https://en.wikipedia.org/wiki/Cruise_control (last accessed Mar. 24, 2021).
Unknown, "Two-second rule," found at https://en.wikipedia.org/wiki/Two-second_rule (last accessed Jan. 19, 2021).

* cited by examiner

| | Name | Residence | Time | Speed | Weather | Visibility | Temperature | Road Condition | Road Type | Lane Number | Lane Type | Preceding Type | Traffic |
|---|---|---|---|---|---|---|---|---|---|---|---|---|---|
| 440 | Alice Alpha | Minneapolis | 1930 | 30 mph | precipitation | poor | 30°F | wet | arterial | 1 | travel | car | heavy |
| 442 | Alice Alpha | Minneapolis | 1200 | 55 mph | sunny | good | 50°F | dry | freeway | 2 | travel | truck | light |
| 444 | Bob Bravo | Los Angeles | 0915 | 35 mph | sunny | good | 70°F | dry | arterial | 1 | turn | car | heavy |
| 446 | Bob Bravo | Los Angeles | 1730 | 75 mph | sunny | good | 80°F | dry | freeway | 1 | travel | truck | heavy |
| 448 | Carol Charles | Green Bay | 2000 | 70 mph | sunny | poor | 20°F | dry | freeway | 2 | travel | car | light |
| 450 | Carol Charles | Green Bay | 0830 | 65 mph | precipitation | good | 40°F | wet | freeway | 3 | travel | truck | heavy |
| 452 | Dave Delta | Minneapolis | 1000 | 50 mph | precipitation | good | 30°F | dry | arterial | 1 | travel | car | light |
| 454 | Dave Delta | Minneapolis | 1300 | 30 mph | sunny | good | 70°F | dry | freeway | 2 | travel | car | light |
| 456 | Ellen Echo | Buffalo | 1630 | 50 mph | precipitation | good | 30°F | wet | freeway | 3 | travel | truck | heavy |
| 458 | Ellen Echo | Buffalo | 1130 | 30 mph | precipitation | poor | 40°F | wet | arterial | 1 | turn | car | light |
| 460 | Frank Foxtrot | Miami | 1500 | 40 mph | sunny | good | 80°F | wet | arterial | 1 | turn | truck | heavy |
| 462 | Frank Foxtrot | Miami | 1400 | 70 mph | precipitation | good | 90°F | wet | freeway | 2 | travel | car | light |

FIG. 4A

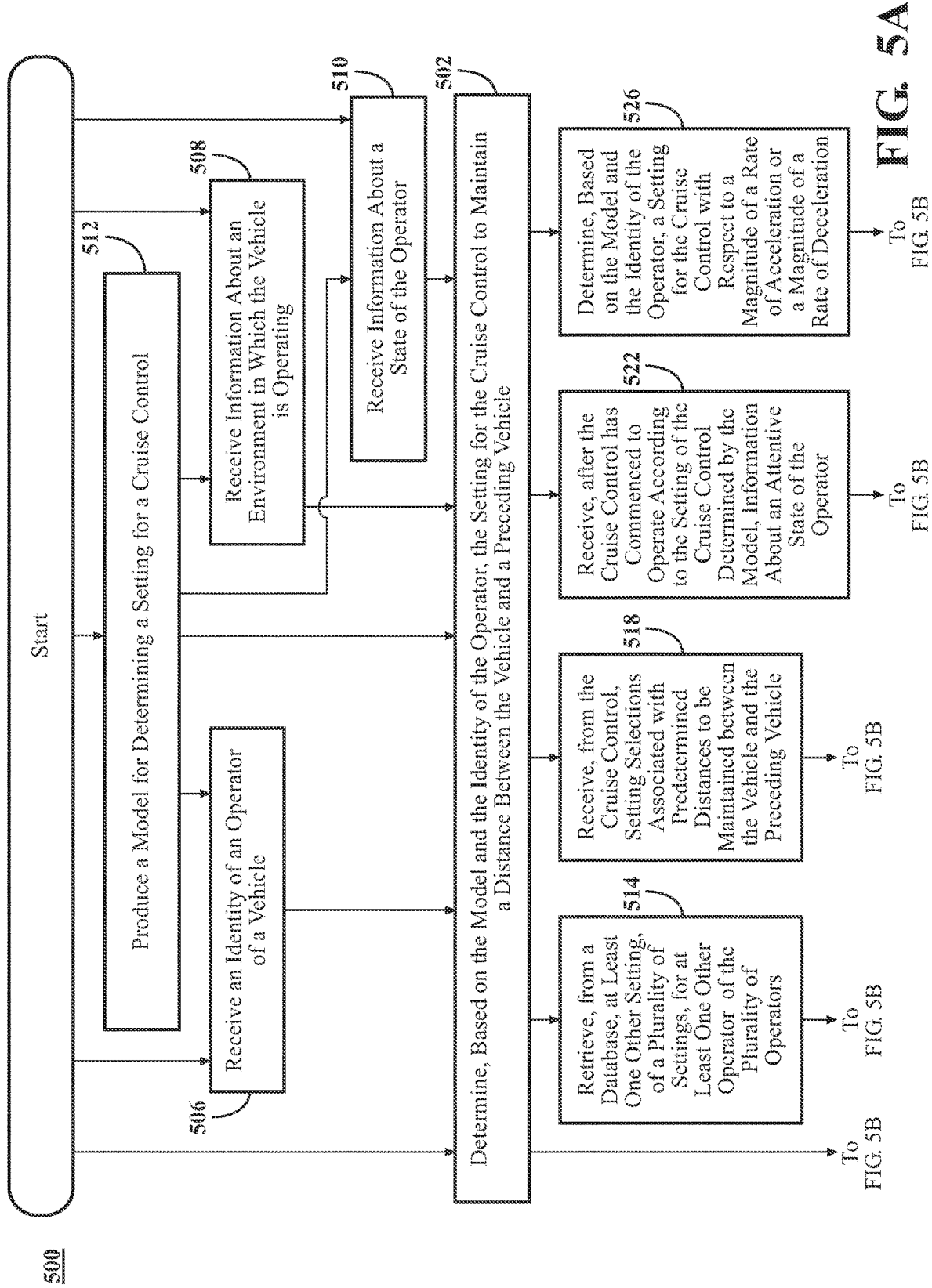

DETERMINING A SETTING FOR A CRUISE CONTROL

TECHNICAL FIELD

The disclosed technologies are directed to determining a setting for a cruise control. Specifically, the disclosed technologies are directed to determining, for a specific operator of a vehicle, a setting for a cruise control using a model based on historical distances that the operator has maintained between the vehicle and a preceding vehicle.

BACKGROUND

Cruise control can be a system for automatically controlling a speed of a vehicle. An operator of the vehicle can select the speed. A cruise control system can include a servomechanism to control a position of a throttle of the vehicle to maintain the speed. Advantages of cruise control can include, for example, one or more of a reduction in a degree of fatigue of the operator of the vehicle, an assurance that the speed of the vehicle is less than a regulatory speed limit, an increase in a fuel efficiency of the vehicle, or the like. More recently, technologies for cruise control have been developed so that a cruise control system can control a braking system of the vehicle, in conjunction with control of the position of the throttle, to maintain a distance between the vehicle and a preceding vehicle. Such a cruise control system can be referred to as adaptive cruise control. Because many operators of vehicles have been trained to measure the distance between the vehicle and the preceding vehicle based on a measure of a duration of time between a first time, at which the preceding vehicle passes a specific location, and a second time at which the vehicle passes the specific location (e.g., the two-second rule), the distance between the vehicle and the preceding vehicle can be referred to as a time gap.

SUMMARY

In an embodiment, a system for determining a setting for a cruise control can include a processor and a memory. The memory can store a preferred time gap determination module and a communications module. The preferred time gap determination module can include instructions that when executed by the processor cause the processor to determine, based on a model and an identity of an operator of a vehicle, a setting for a cruise control to maintain a distance between the vehicle and a preceding vehicle. The model can be based on historical distances maintained by the operator. The communications module can include instructions that when executed by the processor cause the processor to cause the cruise control to operate according to the setting. A rate of energy consumption by the vehicle when the vehicle is controlled by the cruise control can be less than the rate of energy consumption when the vehicle lacks being controlled by the cruise control.

In another embodiment, a method for determining a setting for a cruise control can include determining, by a processor and based on a model and an identity of an operator of a vehicle, a setting for a cruise control to maintain a distance between the vehicle and a preceding vehicle. The model can be based on historical distances maintained by the operator. The method can include causing, by the processor, the cruise control to operate according to the setting. A rate of energy consumption by the vehicle when the vehicle is controlled by the cruise control can be less than the rate of energy consumption when the vehicle lacks being controlled by the cruise control.

In another embodiment, a non-transitory computer-readable medium for determining a setting for a cruise control can include instructions that when executed by one or more processors cause the one or more processors to determine, based on a model and an identity of an operator of a vehicle, a setting for a cruise control to maintain a distance between the vehicle and a preceding vehicle. The model can be based on historical distances maintained by the operator. The non-transitory computer-readable medium can include instructions that when executed by the one or more processors cause the one or more processors to cause the cruise control to operate according to the setting. A rate of energy consumption by the vehicle when the vehicle is controlled by the cruise control can be less than the rate of energy consumption when the vehicle lacks being controlled by the cruise control.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A and 4B include a diagram that illustrates an example of a database, according to the disclosed technologies.

FIGS. 5A and 5B include a flow diagram that illustrates an example of a method for determining a setting for a cruise control, according to the disclosed technologies.

DETAILED DESCRIPTION

Figure 1:
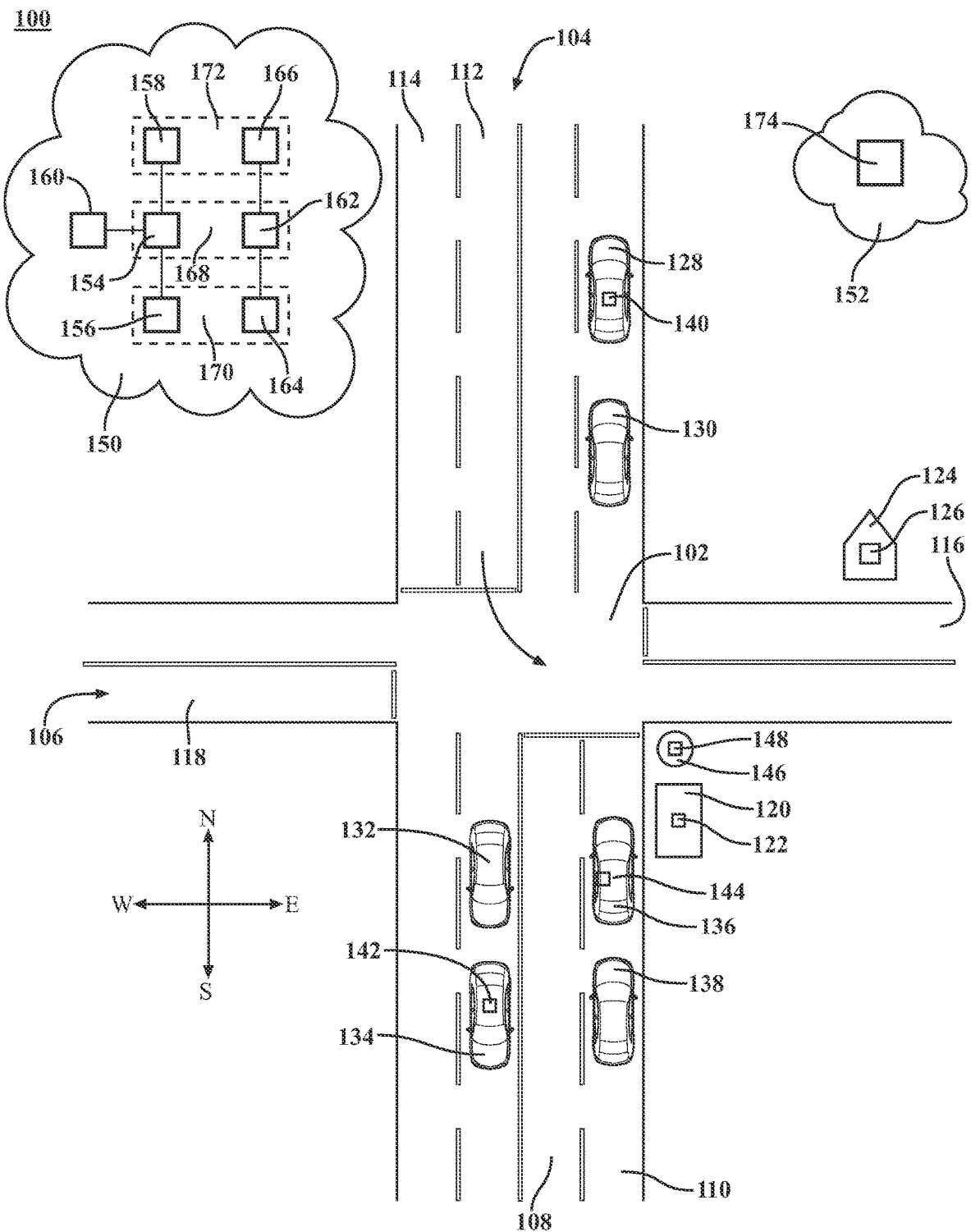
FIG. 1 includes a diagram that illustrates an example of an environment for determining a setting for a cruise control, according to the disclosed technologies.

The disclosed technologies can determine a setting for a cruise control. For example, the cruise control can be an adaptive cruise control. Based on a model and an identity of an operator of a vehicle, the setting for the cruise control can be determined to maintain a distance between the vehicle and a preceding vehicle. The model can be based on historical distances maintained by the operator. Additionally, for example, the model can be further based on one or more of information about an environment in which the vehicle is operating or information about a state of the operator of the vehicle. For example, the identity of the operator can be received from one or more of an interface configured to receive information associated with the identity (e.g., a personal identification number (PIN)), a cloud computing platform, a biometric system configured to determine the identity, or the like. The cruise control can be caused to operate according to the setting. A rate of energy consumption by the vehicle when the vehicle is controlled by the cruise control can be less than the rate of energy consumption when the vehicle lacks being controlled by the cruise control.

The Society of Automotive Engineers (SAE) International has specified various levels of driving automation. Specifically, Standard J3016, Taxonomy and Definitions for Terms Related to Driving Automation Systems for On-Road Motor Vehicles, issued by the SAE International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

A vehicle that includes an adaptive cruise control can be considered as having level 1 driving automation.

Efforts to automate vehicles can be pursued for a variety of reasons. Among such reasons can be a desire to reduce an amount of fuel consumed by a vehicle. For example, it is estimated that by 2050 that autonomous vehicles may reduce consumption of fuel by passenger vehicles by 44 percent, and by trucks by 18 percent. However, realization of such a benefit can depend upon a degree of satisfaction, of an operator of a vehicle, with a manner in which the vehicle is operated under a control of automation technology. If the operator is dissatisfied with the manner in which the vehicle is operated under the control of automation technology, then the operator may cause control of the vehicle to be transferred to the operator. For example, if the operator is dissatisfied with the distance between the vehicle and a preceding vehicle being maintained under the control of cruise control (e.g., the distance is greater than or lesser than a distance preferred by the operator), then the operator may cause control of the vehicle to be transferred from the cruise control to the operator so that the operator can maintain the distance between the vehicle and the preceding vehicle at the distance preferred by the operator. Such a transfer of control of the vehicle can undermine the advantage in reduced consumption of fuel intended to be realized when the vehicle is under the control of cruise control.

FIG. 1 includes a diagram that illustrates an example of an environment 100 for determining a setting for a cruise control, according to the disclosed technologies. For example, the environment 100 can include an intersection 102 of a first road 104 and a second road 106. For example, the first road 104 can be disposed along a line of longitude and the second road 106 can be disposed along a line of latitude. For example, the first road 104 can include, for northbound traffic, a lane #1 108 and a lane #2 110. For example, the lane #1 108 can be a travel lane and the lane #2 110 can be a travel lane. For example, the first road 104 can include, for southbound traffic, a lane #1 112 and a lane #2 114. For example, the lane #1 112 can be a turn lane and the lane #2 114 can be a travel lane. For example, the second road 106 can include, for westbound traffic, a lane #1 116. For example, the lane #1 116 can be a travel lane. For example, the second road 106 can include, for eastbound traffic, a lane #1 118. For example, the lane #1 118 can be a travel lane.

For example, the environment 100 can include a roadside infrastructure object 120 (e.g., a bus stop shelter) at the intersection 102. For example, the roadside infrastructure object 120 can support a communications device 122. For example, the environment 100 can include a house 124. For example, an Internet of things device 126 (e.g., a continuous positive airway pressure (CPAP) machine) can be located within the house 124. For example, the environment 100 can include a first vehicle 128, a second vehicle 130, a third vehicle 132, a fourth vehicle 134, a fifth vehicle 136, and a sixth vehicle 138. For example, the first vehicle 128 can have a communications device 140, the fourth vehicle 134 can have a communications device 142, and the fifth vehicle 136 can have a communications device 144. For example, the environment 100 can include a pedestrian 146. The pedestrian 146 can be carrying a communications device 148.

For example, the environment 100 can include a first cloud computing platform 150 and a second cloud computing platform 152. For example, the first cloud computing platform 150 can include a first processor 154, a first memory 156, and a first communications device 158. Additionally, for example, the first cloud computing platform 150 can include a data store 160. Additionally, for example, the first cloud computing platform 150 can include a second processor 162, a second memory 164, and a second communications device 166. Alternatively, for example, one or more of the first processor 154 and the second processor 162 can be combined as a processor 168, the first memory 156 and the second memory 164 can be combined as a memory 170, or the first communications device 158 and the second communications device 166 can be combined as a communications device 172. For example, the second cloud computing platform 152 can include a communications device 174.

Figure 2:
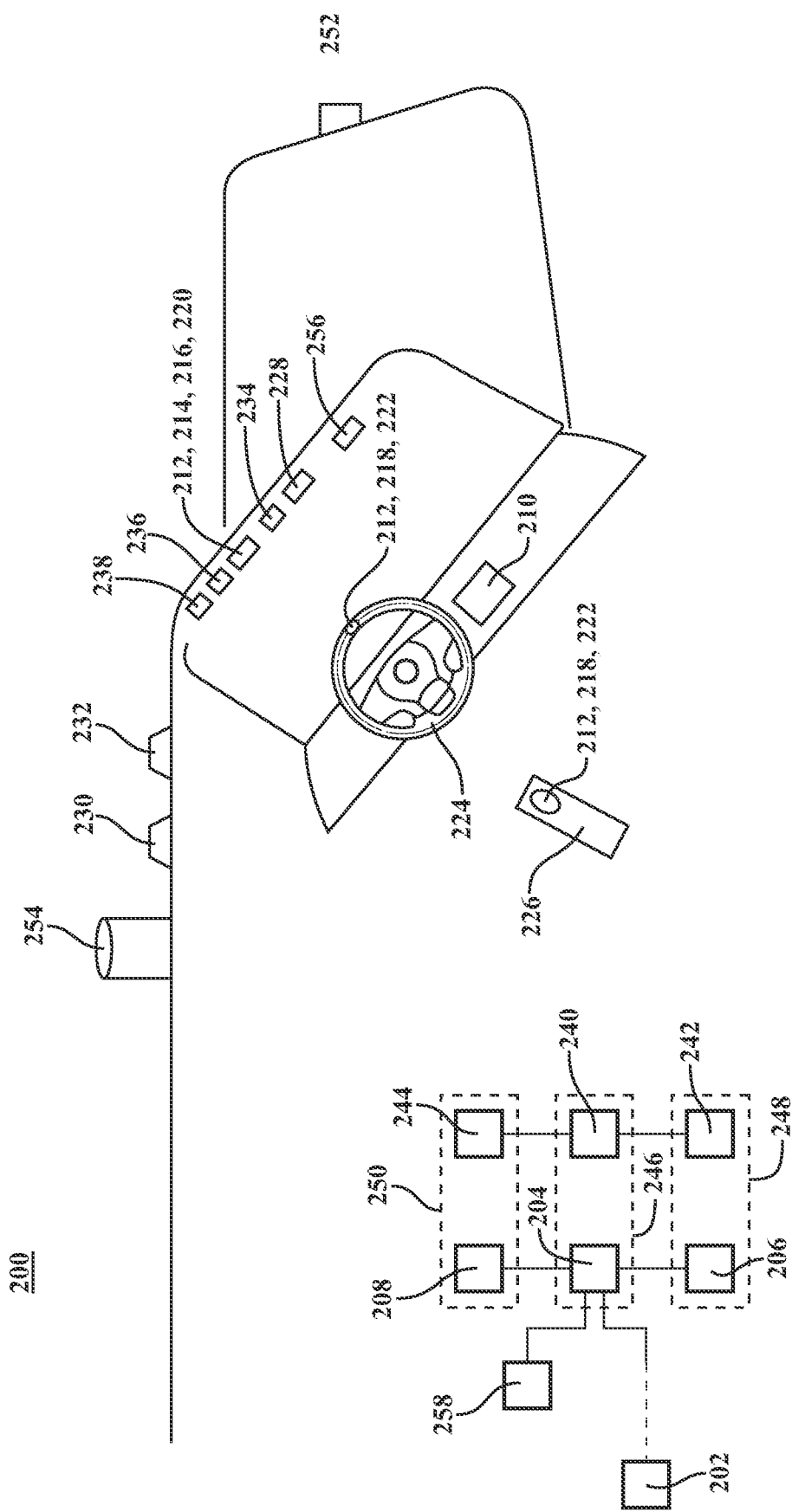
FIG. 2 includes a diagram that illustrates an example of a vehicle for use in determining a setting for a cruise control, according to the disclosed technologies.

FIG. 2 includes a diagram that illustrates an example of a vehicle 200 for use in determining a setting for a cruise control 202, according to the disclosed technologies. For example, the cruise control 202 can be an adaptive cruise control. The vehicle 200 can include, for example, a first processor 204, a first memory 206, and a first communications device 208. The cruise control 202 can be communicably coupled to the first processor 204. The first memory 206 can be communicably coupled to the first processor 204. The first communications device 208 can be communicably coupled to the first processor 204.

Additionally, for example, the vehicle 200 can include one or more of an interface 210, a biometric system 212, or the like. For example, the interface 210 can be configured to receive information associated with an identity of an operator of the vehicle 200. For example, the information associated with the identity of the operator of the vehicle 200 can be a personal identification number (PIN). For example, the biometric system 212 can be configured to determine the identity of the operator of the vehicle 200. For example, the biometric system 212 can include one or more of a face recognition system 214, an iris recognition system 216, a fingerprint recognition system 218, or the like. For example, one or more of the face recognition system 214 or the iris recognition system 216 can include a camera 220 disposed on the vehicle 200 at a location that faces toward the operator of the vehicle 200. For example, the fingerprint recognition system 218 can include a fingerprint scanner 222 disposed on one or more of a steering wheel 224 of the vehicle 200 or a joystick-like control lever 226 of the vehicle 200.

Additionally, for example, the vehicle 200 can include one or more of a forward facing camera 228, a temperature sensor 230, or a light sensor 232.

Additionally, for example, the vehicle 200 can include one or more of a still image camera 234, a video camera 236, an infrared camera 238, or the like. For example, the one or more of the still image camera 234, the video camera 236, or the infrared camera 238 can be disposed on the vehicle 200 at a location that faces toward the operator of the vehicle 200.

Additionally, for example, the vehicle 200 can include a second processor 240, a second memory 242, and a second communications device 244. Alternatively, for example, one or more of the first processor 204 and the second processor 240 can be combined as a processor 246, the first memory 206 and the second memory 242 can be combined as a memory 248, or the first communications device 208 and the second communications device 244 can be combined as a communications device 250.

Additionally, for example, the vehicle 200 can include one or more of a radar 252, a lidar 254, or a depth camera 256.

Additionally, for example, the vehicle 200 can include a data store 258.

Figure 3:
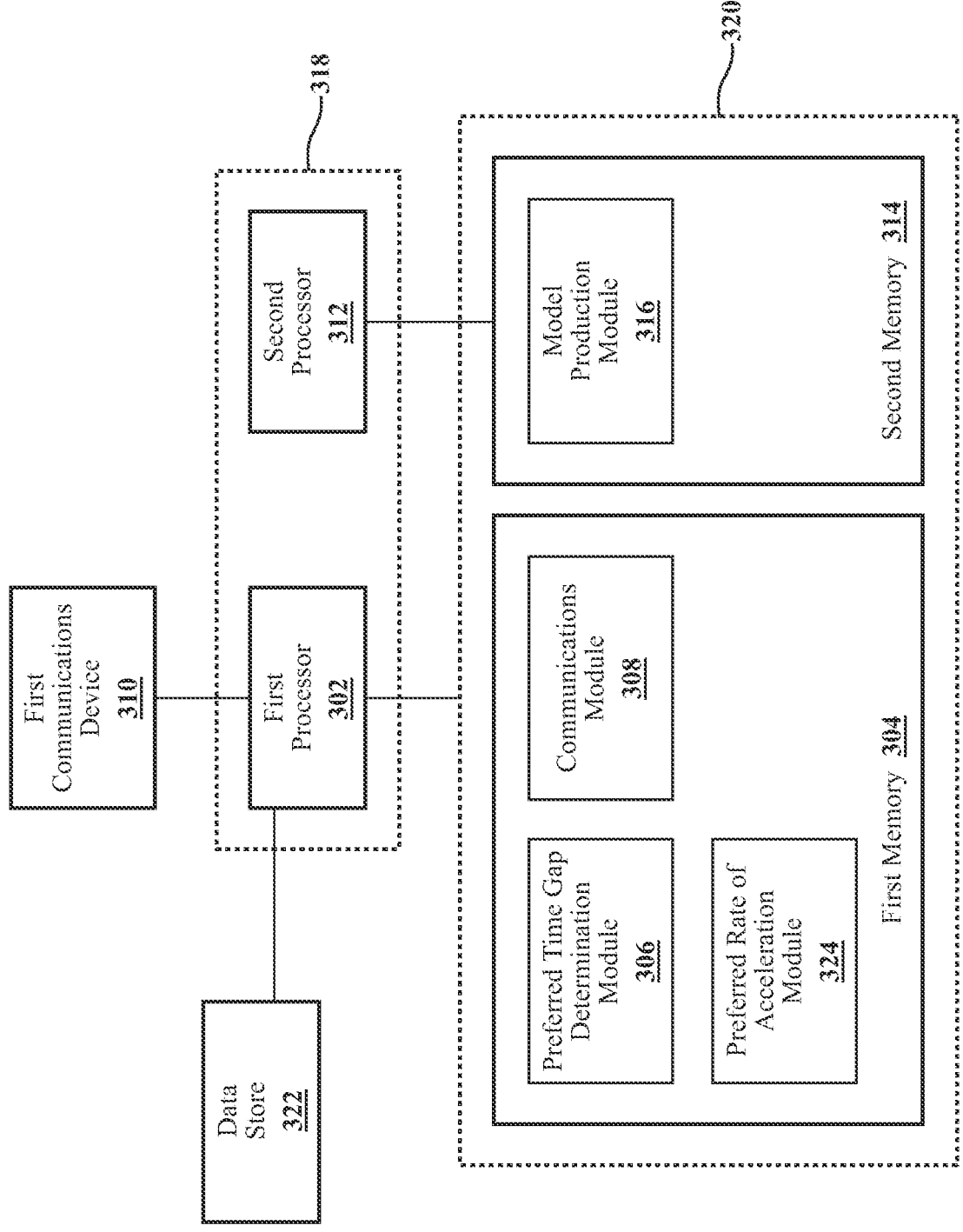
FIG. 3 includes a block diagram that illustrates an example of a system for determining a setting for a cruise control, according to the disclosed technologies.

FIG. 3 includes a block diagram that illustrates an example of a system 300 for determining a setting for a cruise control, according to the disclosed technologies. The system 300 can include, for example, a first processor 302 and a first memory 304. The first memory 304 can be communicably coupled to the first processor 302. For example, the first memory 304 can store a preferred time gap determination module 306 and a communications module 308. The preferred time gap determination module 306 can include instructions that function to control the first processor 302 to determine, based on a model and an identity of an operator of a vehicle, the setting for the cruise control to maintain a distance between the vehicle and a preceding vehicle. The model can be based on historical distances maintained by the operator. The communications module 308 can include instructions that function to control the first processor 302 to cause the cruise control to operate according to the setting. For example, the vehicle can be the vehicle 200 and the cruise control can be the cruise control 202 illustrated in FIG. 2. For example, the cruise control can be an adaptive cruise control. A rate of energy consumption by the vehicle when the vehicle is controlled by the cruise control can be less than the rate of energy consumption when the vehicle lacks being controlled by the cruise control.

For example, the first processor 302 can be disposed on the vehicle. For example, the first processor 302 can be the first processor 204 illustrated in FIG. 2.

Alternatively, for example, the system 300 can further include a communications device 310. For example, the first processor 302 can be disposed on a cloud computing platform. For example, the instructions that cause the cruise control to operate according to the setting can include instructions that function to control the first processor 302 to communicate, via the communications device 310, the setting to the cruise control disposed on the vehicle. For example, the cloud computing platform can be the first cloud computing platform 150, the first processor 302 can be the first processor 154, and the communications device 310 can be the first communications device 158 illustrated in FIG. 1.

In a first implementation of the disclosed technologies, the system 300 can further include the communications device 310. The communications module 308 can further include instructions that function to control the first processor 302 to receive, via the communications device 310, the identity of the operator. For example, the instructions to receive the identity of the operator can include instructions that function to control the first processor 302 to receive the identity of the operator from one or more of an interface configured to receive information associated with the identity (e.g., a personal identification number (PIN)), a cloud computing platform, a biometric system configured to determine the identity, or the like. For example, the biometric system can include one or more of a face recognition system, an iris recognition system, a fingerprint recognition system, or the like. For example, the interface configured to receive the information associated with the identity can be the interface 210 illustrated in FIG. 2. For example, the cloud computing platform can be the second computing platform 152 illustrated in FIG. 1. For example, the biometric system can be the biometric system 212, the face recognition system can be the face recognition system 214, the iris recognition system can be the iris recognition system 216, and the fingerprint recognition system can be the fingerprint recognition system 218 illustrated in FIG. 2.

In a second implementation of the disclosed technologies, the model can be further based on information about an environment in which the vehicle is operating.

For example, the information about the environment can include one or more of a speed of the vehicle, a weather in a vicinity of the vehicle, a visibility in the vicinity, a temperature in the vicinity, a measure of traffic in the vicinity, a condition of a road in the vicinity, a type of the road, a number of a lane of the road, a type of the lane, a time of day, a type of the preceding vehicle, a color of the preceding vehicle, or the like. For example, the distance between the vehicle and the preceding vehicle preferred by the operator can be a function of the speed of the vehicle. For example, if a road has more than one lane for traffic in a specific direction, then by convention the leftmost lane can be identified as a lane #1 and each successive lane to the right can be identified by an incremental number. Knowledge of the number of the lane of the road can be useful because by convention faster moving traffic tends to use left lanes while slower moving traffic tends to use right lanes. For example, the type of lane can be a travel lane, a turn lane, or the like. A travel lane can be a lane designated for movement of vehicles from an origination to a destination. A turn lane can be a lane designated for vehicles making turns. Knowledge of the type of lane can be useful because traffic in a turn lane is likely to be slower than traffic in a travel lane. For example, the type of the preceding vehicle can be a car, a truck, or the like. Knowledge of the type of the preceding vehicle can be useful because the distance maintained by the operator between the vehicle and the preceding vehicle may be greater for a preceding truck than for a preceding car. For example, a specific color of the preceding vehicle (e.g., metallic silver) can be more likely to be associated with a first type of vehicle (e.g., a truck) than with a second type of vehicle (e.g., a car). For this reason, knowledge of the color of the preceding vehicle can be useful to determine the type of the preceding vehicle.

For example, the system 300 can further include the communications device 310. The communications module 308 can further include instructions that function to control the first processor 302 to receive, via the communications device 310, the information about the environment. For example, the instructions to receive the information about the environment can include instructions that function to control the first processor 302 to receive the information about the environment from one or more of a sensor of the vehicle, a cloud computing platform, another object in a vicinity of the vehicle, or the like. For example, the sensor of the vehicle can include one or more of a camera, a temperature sensor, a light sensor, or the like. For example, the other object can include one or more of another vehicle, a pedestrian, a roadside infrastructure object, or the like. For example, the other vehicle can be the preceding vehicle. For example, the camera can be the forward facing camera 228, the temperature sensor can be the temperature sensor 230, and the light sensor can be the light sensor 232 illustrated in FIG. 2. For example, the cloud computing platform can be the second cloud computing platform 152 illustrated in FIG. 1. For example, if the vehicle is the second vehicle 130 illustrated in FIG. 1, then the other vehicle can be one or more of the first vehicle 128, the fourth vehicle 134, or the fifth vehicle 136, the pedestrian can be the pedestrian 146, and the roadside infrastructure object can be the roadside infrastructure object 120 (e.g., the bus stop shelter) illustrated in FIG. 1.

In a third implementation of the disclosed technologies, the model can be further based on information about a state of the operator of the vehicle.

For example, the information about the state of the operator can include one or more of information about an emotional state of the operator, information about an attentive state of the operator, information about a quality of a duration of sleep of the operator at a time before a current operation of the vehicle, or the like. For example, the one or more of the information about the emotional state of the operator or the information about the quality of the duration of sleep of the operator at the time before the current operation of the vehicle can be derived from one or more of a heart rate of the operator, a measure of a pupil of an eye of the operator, a motion of the operator indicative of a state of surprise, information about a breathing of the operator during the duration of sleep, or the like.

For example, the system 300 can further include the communications device 310. The communications module 308 can further include instructions that function to control the first processor 302 to receive, via the communications device 310, the information about the state of the operator. For example, the instructions to receive the information about the state of the operator can include instructions that function to control the first processor 302 to receive the information about the state of the operator from one or more of a still image camera, a video camera, an infrared camera, a continuous positive airway pressure (CPAP) machine, or the like. For example, the continuous positive airway pressure (CPAP) machine can be an Internet of things machine. For example, the still camera can be the still image camera 234, the video camera can be the video camera 236, and the infrared camera can be the infrared camera 238 illustrated in FIG. 2. For example, the continuous positive airway pressure (CPAP) machine can be the Internet of things device 126 illustrated in FIG. 1.

In a fourth implementation of the disclosed technologies, the system 300 can further include a second processor 312 and a second memory 314. The second memory 314 can be communicably coupled to the second processor 312. For example, the second memory 314 can store a model production module 316. The model production module 316 can include instructions that function to control the second processor 312 to produce the model.

For example, the second processor 312 and the second memory 314 can be disposed on the vehicle. For example, the second processor 312 can be the second processor 240 and the second memory 314 can be the second memory 242 illustrated in FIG. 2. Alternatively, for example, one or more of the first processor 302 and the second processor 312 can be combined as a processor 318 or the first memory 304 and the second memory 314 can be combined as a memory 320. For example, the processor 318 can be the processor 246 and the memory 320 can be the memory 248 illustrated in FIG. 2.

Alternatively, for example, the second processor 312 and the second memory 314 can be disposed on a cloud computing platform. For example, the cloud computing platform can be the first cloud computing platform 150, the second processor 312 can be the second processor 162, and the second memory 314 can be the second memory 164 illustrated in FIG. 1. Alternatively, for example, one or more of the first processor 302 and the second processor 312 can be combined as the processor 318 or the first memory 304 and the second memory 314 can be combined as the memory 320. For example, the processor 318 can be the processor 168 and the memory 320 can be the memory 170 illustrated in FIG. 1.

For example, the instructions to produce the model can include instructions that function to control the second processor 312 to update the model. For example, the instructions to update the model can include instructions that function to control the second processor 312 to update the model continually. Alternatively, for example, the instructions to update the model can include instructions that function to control the second processor 312 to update the model in response to an event. For example, the event can include a duration of time at which the vehicle is stationary being greater than a threshold duration of time. For example, if the threshold duration of time is six hours, then the event can be the vehicle being parked overnight.

In a first configuration of the fourth implementation of the disclosed technologies, the instructions to produce the model can include instructions that function to control the second processor 312 to obtain the historical distances maintained by the operator.

For example, the instructions to produce the model can further include instructions that function to control the second processor 312 to produce the model from a set of the historical distances. For example, the set of the historical distances can be a continual accumulation of the historical distances that are obtained. Alternatively, for example, the set can be of a specific count of a number of instances of a recording of the historical distances. The instances of the recording of the historical distances can be a most recent instances of the recording of the historical distances. That is, as the historical distances are obtained, the set can include the specific count of the most recent instances of the recording of the historical distances so that older instances of the recording of the historical distances are removed from the set as newer instances of the recording of the historical distances are added to the set.

For example, the instructions to obtain the historical distances can include instructions that function to control the second processor 312 to obtain the historical distances one or more of periodically or in response to an event. For example, the historical distances can be obtained periodically every second. Additionally or alternatively, the event can include one or more of a speed of the vehicle being greater than a threshold speed, the operator of the vehicle causing the speed of the vehicle to increase, the operator of the vehicle causing the speed of the vehicle to decrease, the operator of the vehicle causing the cruise control to control the vehicle, at least once during a duration of time of movement of the vehicle from an origination to a destination (e.g., a trip), or the like.

For example, the speed of the vehicle being greater than the threshold speed can be indicative that the vehicle is at a location at which the operator is likely to use the cruise control (e.g., the location of the vehicle is not a parking lot, a local road, or the like). For example, the operator of the vehicle causing the speed of the vehicle to increase can be indicative that the operator of the vehicle believes that the distance between the vehicle and the preceding vehicle is greater than a preferred distance. Likewise, for example, the operator of the vehicle causing the speed of the vehicle to decrease can be indicative that the operator of the vehicle believes that the distance between the vehicle and the preceding vehicle is less than the preferred distance.

For example, the event can include a first type of event and a second type of event. For example, the instructions to produce the model can include instructions that function to control the second processor 312 to apply a first weight to the historical distances obtained in response to the first type of event and to apply a second weight to the historical distances obtained in response the second type of event. For example, the first type of event can be the operator of the vehicle causing the cruise control to control the vehicle and the second type of event can be the operator of the vehicle causing the speed of the vehicle to increase. For example, a value of the first weight can be greater than a value of the second weight.

For example, the instructions to obtain the historical distances can include instructions that function to control the second processor 312 to obtain the historical distances from one or more of a radar disposed on the vehicle, a lidar disposed on the vehicle, an analysis of a depth image produced by at least one camera disposed on the vehicle, or the like. For example, the radar can be the radar 252, the lidar can be the lidar 254, and the at least one camera can be the depth camera 256 illustrated in FIG. 2.

In a second configuration of the fourth implementation of the disclosed technologies, the instructions to produce the model can further include instructions that function to control the second processor 312 to filter the historical distances.

For example, the instructions to filter the historical distances can include instructions that function to control the second processor 312 to remove, from a set of the historical distances, the historical distances excluded from a subset of the set. The subset can include the historical distances that are less than a threshold distance at times for which an absolute relative velocity between the vehicle and the preceding vehicle is less than a threshold absolute relative velocity for greater than a threshold duration of time. For example, the vehicle can be the second vehicle 130 and the preceding vehicle can be the first vehicle 128 illustrated in FIG. 1. For example: (1) the threshold distance can be a distance associated with a time gap of 2.5 seconds, (2) the absolute relative velocity can be five miles per hour, and (3) the threshold duration of time can be five seconds. For example, meeting such criteria can be indicative of an intent of the operator of the second vehicle 130 to maintain a current distance between the second vehicle 130 and the first vehicle 128 illustrated in FIG. 1. The subset of the historical distances can exclude the historical distances that do not comply with such criteria. For example, the setting for the cruise control produced by such a model can be a mean of the historical distances included in the subset.

Alternatively, for example, the instructions to filter the historical distances can include instructions that function to control the second processor 312 to remove, from a set of the historical distances, one or more of the historical distances that are greater than a first threshold distance or the historical distances that are less than a second threshold distance. For example, the model production module 316 can further include instructions that function to control the second processor 312 to: (1) determine the first threshold distance to be a distance at a time at which an acceleration of the vehicle is greater than zero and (2) determine the second threshold distance to be a distance at a time at which the acceleration of the vehicle is less than zero. For example, the vehicle can be the second vehicle 130 and the preceding vehicle can be the first vehicle 128 illustrated in FIG. 1. For example, having the acceleration of the vehicle be greater than zero can be indicative of an intent of the operator to cause a distance between the second vehicle 130 and the first vehicle 128 to be decreased. Likewise, for example, having the acceleration of the vehicle be less than zero can be indicative of an intent of the operator to cause the distance between the second vehicle 130 and the first vehicle 128 to be increased. For example, the setting for the cruise control produced by such a model can be a median of the first threshold distance and the second threshold distance.

In a third configuration of the fourth implementation of the disclosed technologies, the model production module 316 can further include instructions that function to control the second processor 312 to obtain one or more of: (1) information about an environment in which the vehicle operated at times that correspond to times of production of the historical distances or (2) information about a state of the operator of the vehicle at the times that correspond to the times of production of the historical distances. For example, the model production module 316 can further include instructions that function to control the second processor 312 to produce the model by processing the historical distances and the one or more of: (1) the information about the environment or (2) the information about the state of the operator using one or more of a sample mean technique, a maximum likelihood estimates (MLE) technique, a maximum a posteriori (MAP) estimate technique, a Bayesian inference technique, a partially observable Markov decision process (POMDP) model technique, a long short-term memory (LSTM) neural network architecture, a transfer learning algorithm for a neural network, or the like.

Figure 4B:
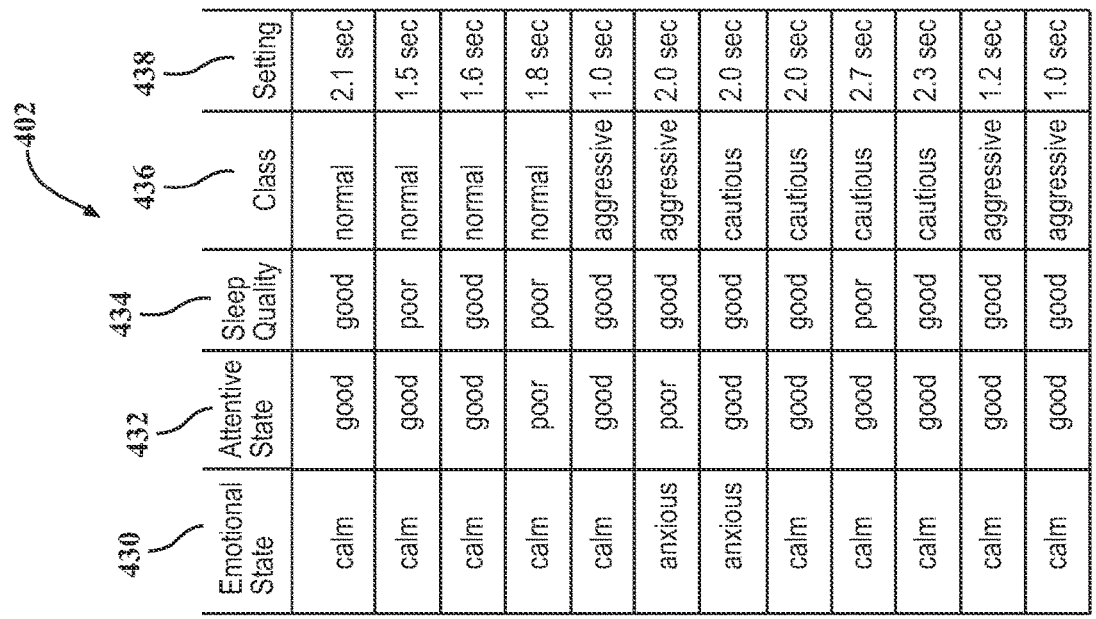

FIGS. 4A and 4B include a diagram that illustrates an example of a database 400, according to the disclosed technologies. For example, the database 400 can include a table 402. The table 402 can include, for example, fields for a name 404 of an operator of a vehicle, a residence 406 of the operator, a time 408 of an instance of a recording of distance between the vehicle and a preceding vehicle, a speed 410 of the vehicle at the time 408 of the instance, a weather 412 at the time 408 of the instance, a visibility 414 at the time 408 of the instance, a temperature 416 at the time 408 of the instance, a road condition 418 at the time 408 of the instance, a road type 420 at the time 408 of the instance, a lane number 422 at the time 408 of the instance, a lane type 424 at the time 408 of the instance, a preceding type 426 of the preceding vehicle at the time 408 of the instance, a traffic 428 condition at the time 408 of the instance, an emotional state 430 of the operator at the time 408 of the instance, an attentive state 432 of the operator at the time 408 of the instance, a sleep quality 434 of a duration of sleep of the operator at a time before the time 408 of the instance, a class 436 to which the operator has been assigned, and the setting 438 of the cruise control determined by the model.

For example, the weather 412 field can have a value of sunny or precipitation, the visibility 414 field can have a value of good or poor, the road condition 418 field can have a value of dry or wet, the road type 420 field can have a value of freeway or arterial, the lane type 424 field can have a value of travel or turn, the traffic 428 field can have a value of light or heavy, the emotional state 430 field can have a value of calm or anxious, the attentive state 432 field can have a value of good or poor, the sleep quality 434 field can have a value of good or poor, and the class 436 field can have a value of normal, cautious, or aggressive.

For example, the table 402 can have a first record 440, a second record 442, a third record 444, a fourth record 446, a fifth record 448, a sixth record 450, a seventh record 452, an eighth record 454, a ninth record 456, a tenth record 458, an eleventh record 460, and a twelfth record 462.

Returning to FIG. 3, in a fifth implementation of the disclosed technologies, the system 300 can further include a data store 322. The data store 322 can be communicably coupled to the first processor 302. The data store 322 can be configured to store a database. For example, the database can be the database 400 illustrated in FIGS. 4A and 4B. The setting of the cruise control determined by the model can be stored in the database. The setting can be indexed by the identity of the operator. For example, the instructions to determine the setting for the cruise control can include instructions that function to control the first processor 302 to: (1) receive the identity of the operator and (2) retrieve, from the database and based on the identity of the operator, the setting of the cruise control determined by the model. With reference to FIGS. 4A and 4B, for example, if the identity of the operator is Alice Alpha, then the setting of the cruise control determined by the model can be retrieved from the setting 438 field of the first record 440 in which a value of the name 404 field is Alice Alpha.

Returning to FIG. 3, for example, the data store 322 can be disposed on the vehicle. For example, the data store 322 can be the data store 258 illustrated in FIG. 2.

Alternatively, for example, the data store 322 can be disposed on a cloud computing platform. For example, the cloud computing platform can be the first cloud computing platform 150 and the data store 322 can be the data store 160 illustrated in FIG. 1.

For example, the setting can be further indexed by one or more of: (1) information about an environment in which the vehicle operated at times that correspond to times of production of the historical distances or (2) information about a state of the operator of the vehicle at the times that correspond to the times of production of the historical distances. For example, the instructions to determine the setting for the cruise control can further include instructions that function to control the first processor 302 to: (1) receive one or more of: (a) information about an environment in which the vehicle is operating or (b) information about a state of the operator and (2) retrieve, from the database and based on the one or more of: (a) the information about the environment in which the vehicle is operating or (b) the information about the state of the operator, the setting of the cruise control determined by the model. With reference to FIGS. 4A and 4B, for example, if: (1) the identity of the operator is Alice Alpha, (2) the information about the environment in which the vehicle is operating is that the weather includes precipitation, and (3) the information about the state of the operator is that her attentive state is good, then the setting of the cruise control determined by the model can be retrieved from the setting 438 field of the first record 440 in which: (1) a value of the name 404 field is Alice Alpha, (2) a value of the weather 412 field is precipitation, and (3) a value of the attentive state 432 field is good, then the setting of the cruise control determined by the model can be retrieved from the setting 438 field of the first record 440 in which: (1) a value of the name 404 field is Alice Alpha, (2) a value of the weather 412 field is precipitation, and (3) a value of the attentive state 432 field is good.

Returning to FIG. 3, for example, the database can store a plurality of settings for the operator. A first setting, of the plurality of settings, can corresponds to a first item of the one or more of: (1) the information about the environment in which the vehicle is operating or (2) the information about the state of the operator. A second setting, of the plurality of settings, can correspond to a second item of the one or more of: (1) the information about the environment in which the vehicle is operating or (2) the information about the state of the operator. With reference to FIGS. 4A and 4B, for example, the database 400 can store a plurality of settings for the operator Alice Alpha. A first setting, included in the first record 440, can correspond to a first item in which one or more of: (1) the information about the environment in which the vehicle is operating is that the road condition is wet or (2) the information about the state of the operator is that the sleep quality, of a duration of sleep of the operator at a time before the time 408 of the instance associated with the first record 440, was good. A second setting, included in the second record 442, can correspond to a second item in which one or more of: (1) the information about the environment in which the vehicle is operating is that the road condition is dry or (2) the information about the state of the operator is that the sleep quality, of a duration of sleep of the operator at a time before the time 408 of the instance associated with the second record 442, was poor.

Returning to FIG. 3, in a sixth implementation of the disclosed technologies, the system 300 can further include the data store 322. The date store 322 can be communicably coupled to the first processor 302. The data store 322 can be configured to store a database. For example, the database can be the database 400 illustrated in FIGS. 4A and 4B. The database can store a plurality of settings for a plurality of operators.

For example, the operators can be assigned to classes. The settings can be indexed by the classes. For example, the instructions to determine the setting for the cruise control can include instructions that function to control the first processor 302 to: (1) receive the identity of the operator, (2) determine, based on the identity of the operator, a class, of the plurality of classes, of the operator, and (3) retrieve, from the database and based on the class, the setting of the cruise control determined by the model. With reference to FIGS. 4A and 4B, for example, if the identity of the operator is Carol Charles, then the class, aggressive, can be determined from a value of the class 436 field of the fifth record 448 in which a value of the name 404 field is Carol Charles and the setting of the cruise control determined by the model can be retrieved from the setting field 438 of the fifth record 448, the sixth record 450, the ninth record 456, and the tenth record 458 in which a value of the class 436 field is aggressive. For example, the setting of the cruise control determined by the model can be an average of the values of the setting field 438 of the fifth record 448, the sixth record 450, the ninth record 456, and the tenth record 458.

Returning to FIG. 3, additionally or alternatively, for example, the settings can be indexed by identities of the operators. For example, the instructions to determine the setting for the cruise control can include instructions that function to control the first processor 302 to: (1) receive the identity of the operator and (2) retrieve, from the database and based on the identity of the operator, the setting of the cruise control determined by the model. For example, the preferred time gap determination module 306 can further include instructions that function to control the first processor 302 to: (1) retrieve, from the database, at least one other setting, of the plurality of settings, for at least one other operator of the plurality of operators and (2) adjust, based on the at least one other settings, the setting of the cruise control determined by the model.

With reference to FIGS. 4A and 4B, for example, if the identity of the operator is Bob Bravo, then the setting of the cruise control determined by the model can be retrieved from the setting 438 field of the third record 444 in which a value of the name 404 field is Bob Bravo. However, if a determination is made that the residence of Bob Bravo is Los Angeles, but the vehicle is operating in Minneapolis, the weather includes precipitation, and the temperature is 30° F., then: (1) the setting of the cruise control determined by the model can also be retrieved from the setting 438 field of: (a) the first record 440 in which a value of the name 404 field is Alice Alpha, a value of the residence 406 field is Minneapolis, a value of the weather 412 field is precipitation, and a value of the temperature 416 field is 30° F. and (b) the seventh record 452 in which a value of the name 404 field is Dave Delta, a value of the residence 406 field is Minneapolis, a value of the weather 412 field is precipitation, and a value of the temperature 416 field is 30° F. and (2) the setting of the cruise control determined by the model retrieved from the setting 438 field of the third record 444 (for Bob Bravo) can be adjusted by: (a) the setting of the cruise control determined by the model retrieved from the setting 438 field of the first record 440 (for Alice Alpha) and (b) the setting of the cruise control determined by the model retrieved from the setting 438 field of the seventh record 452 (for Dave Delta). For example, the setting of the cruise control determined by the model can be an average of the values of the setting field 438 of the first record 440, the third record 444, and the seventh record 452. That is, if a determination is made that the environment in which the vehicle is operating may be unfamiliar to the operator of the vehicle, then the preferred time gap determination module 306 can adjust the setting of the cruise control determined by the model based on one or more other settings for one or more other operators that may be more familiar with the environment in which the vehicle is operating.

Returning to FIG. 3, in a seventh implementation of the disclosed technologies, the communications module 308 can further include instructions that function to control the first processor 302 to receive, from the cruise control, setting selections associated with predetermined distances to be maintained between the vehicle and the preceding vehicle. For example, the cruise control can be the cruise control 202 illustrated in FIG. 2. The preferred time gap determination module 306 can further include instructions that function to control the first processor 302 to adjust the setting of the cruise control determined by the model to match a closest setting selection of the setting selections. For example, if: (1) the setting of the cruise control determined by the model is a value of the setting 438 field of the first record 440 illustrated in FIGS. 4A and 4B (2.1 seconds) and (2) the setting selections associated with the predetermined distances received from the cruise control are 1.5 seconds, 2.0 seconds, and 2.5 seconds, then the setting of the cruise control determined by the model (2.1 seconds) can be adjusted to 2.0 seconds to match a closest setting selection of the setting selections.

In an eighth implementation of the disclosed technologies, the communications module 308 can further include instructions that function to control the first processor 302 to receive, after the cruise control has commenced to operate according to the setting of the cruise control determined by the model, information about an attentive state of the operator. For example, the cruise control can be the cruise control 202 illustrated in FIG. 2. The preferred time gap determination module 306 can further include instructions that function to control the first processor 302 to adjust, in response to the information about the attentive state of the operator, the setting of the cruise control determined by the model. For example, if: (1) the setting of the cruise control determined by the model is a value of the setting 438 field of the first record 440 illustrated in FIGS. 4A and 4B (2.1 seconds) and, after the cruise control has commenced to operate according to the setting of the cruise control determined by the model, the information about the attentive state of the operator indicates that the attentive state has changed from good to poor, then then the setting of the cruise control determined by the model (2.1 seconds) can be adjusted (e.g., to 2.5 seconds).

In a ninth implementation of the disclosed technologies, first memory 304 can further store a preferred rate of acceleration module 324. The preferred rate of acceleration module 324 can include instructions that function to control the first processor 302 to determine, based on the model and the identity of the operator of the vehicle, a setting for the cruise control with respect to one or more of a magnitude of a rate of acceleration of the vehicle or a magnitude of a rate of deceleration of the vehicle. The communications module 308 can further include instructions that function to control the first processor 302 to cause the cruise control to operate according to the setting for the cruise control with respect to the at the one or more of the magnitude of the rate of acceleration of the vehicle or the magnitude of the rate of deceleration of the vehicle. For example, in a process of maintaining a distance between a vehicle and a preceding vehicle, the cruise control can cause the vehicle to one or more of accelerate or decelerate in response to a change in a speed of the preceding vehicle. Accordingly, the model can be produced to account for one or more of a preferred magnitude of the rate of acceleration of the vehicle or a preferred magnitude of the rate of deceleration of the vehicle. For example, the cruise control can be caused to operate with respect to the one or more of the preferred magnitude of the rate of acceleration of the vehicle or the preferred magnitude of the rate of deceleration of the vehicle.

Figure 5B:
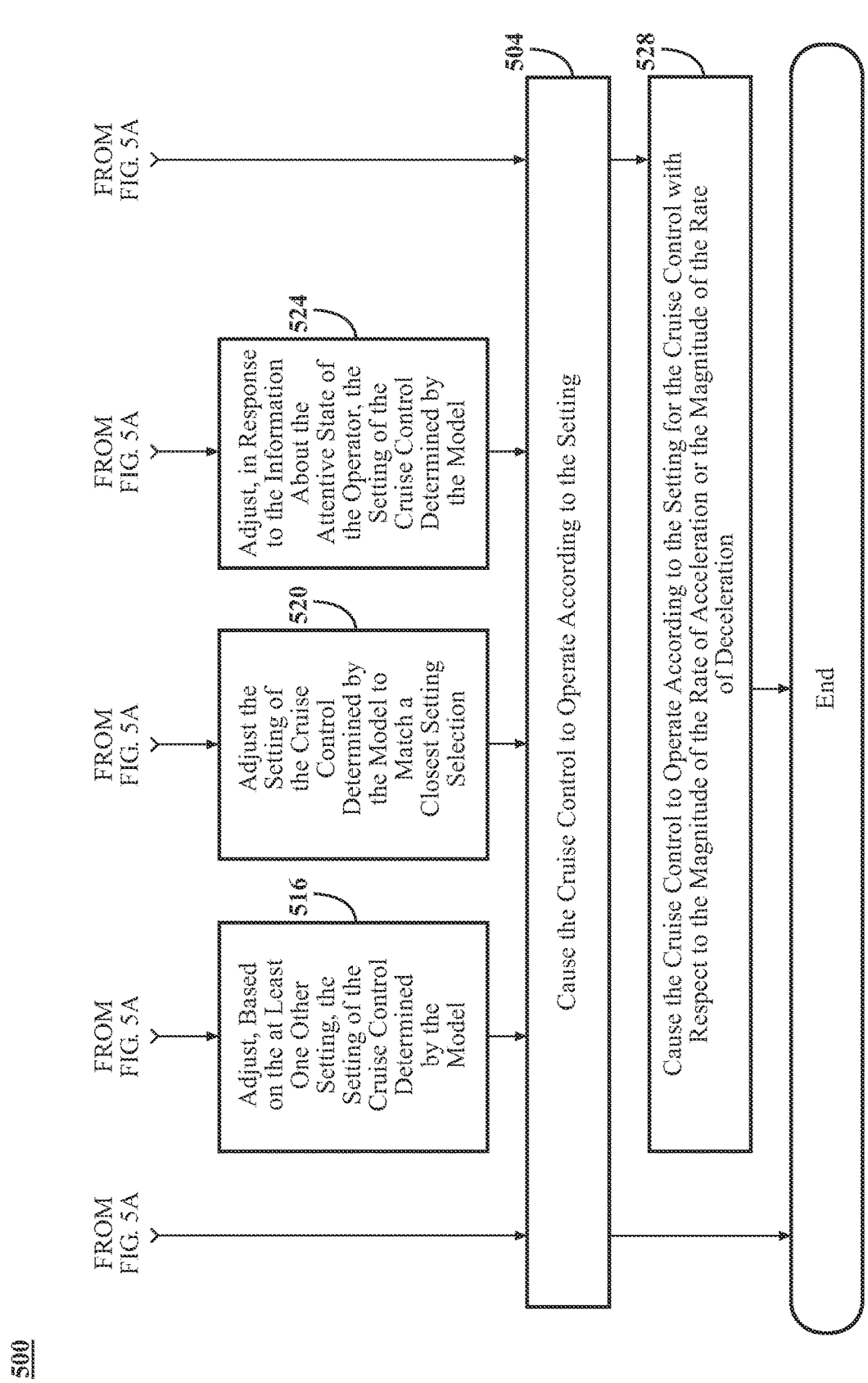

FIGS. 5A and 5B include a flow diagram that illustrates an example of a method 500 for determining a setting for a cruise control, according to the disclosed technologies. The method 500 is described from the perspective of the system 300 illustrated in FIG. 3. Although the method 500 is described in combination with the system 300, one of skill in the art understands, in light of the description herein, that the method 500 is not limited to being implemented by the system 300. Rather, the system 300 is an example of a system that may be used to implement the method 500.

In FIG. 5A, in the method 500, at an operation 502, the preferred time gap determination module 306 can determine, based on a model and an identity of an operator of a vehicle, the setting for the cruise control to maintain a distance between the vehicle and a preceding vehicle. The model can be based on historical distances maintained by the operator. For example, the cruise control can be an adaptive cruise control.

In FIG. 5B, in the method 500, at an operation 504, the communications module 308 can cause the cruise control to operate according to the setting.

A rate of energy consumption by the vehicle when the vehicle is controlled by the cruise control can be less than the rate of energy consumption when the vehicle lacks being controlled by the cruise control.

For example, the preferred time gap determination module 306 and the communications module 308 can be disposed on the vehicle.

Alternatively, for example, the preferred time gap determination module 306 and the communications module 308 can be disposed on a cloud computing platform. For example, at the operation 504, the communications module 308 can cause the cruise control to operate according to the setting by communicating, via a communications device, the setting to the cruise control disposed on the vehicle.

Returning to FIG. 5A, in a first implementation of the disclosed technologies, the method 500 can further include an operation 506. At the operation 506, the communications module 308 can receive, via a communications device, the identity of the operator. For example, the communications module 308 can receive the identity of the operator from one or more of an interface configured to receive information associated with the identity (e.g., a personal identification number (PIN)), a cloud computing platform, a biometric system configured to determine the identity, or the like. For example, the biometric system can include one or more of a face recognition system, an iris recognition system, a fingerprint recognition system, or the like.

In a second implementation of the disclosed technologies, the model can be further based on information about an environment in which the vehicle is operating.

For example, the information about the environment can include one or more of a speed of the vehicle, a weather in a vicinity of the vehicle, a visibility in the vicinity, a temperature in the vicinity, a measure of traffic in the vicinity, a condition of a road in the vicinity, a type of the road, a number of a lane of the road, a type of the lane, a time of day, a type of the preceding vehicle, a color of the preceding vehicle, or the like.

For example, at an operation 508, the communications module 308 can receive the information about the environment. For example, the communications module 308 can receive the information about the environment from one or more of a sensor of the vehicle, a cloud computing platform, another object in a vicinity of the vehicle, or the like. For example, the sensor of the vehicle can include one or more of a camera, a temperature sensor, a light sensor, or the like. For example, the other object can include one or more of another vehicle, a pedestrian, a roadside infrastructure object, or the like. For example, the other vehicle can be the preceding vehicle.

In a third implementation of the disclosed technologies, the model can be further based on information about a state of the operator of the vehicle.

For example, the information about the state of the operator can include one or more of information about an emotional state of the operator, information about an attentive state of the operator, information about a quality of a duration of sleep of the operator at a time before a current operation of the vehicle, or the like. For example, the one or more of the information about the emotional state of the operator or the information about the quality of the duration of sleep of the operator at the time before the current operation of the vehicle can be derived from one or more of a heart rate of the operator, a measure of a pupil of an eye of the operator, a motion of the operator indicative of a state of surprise, information about a breathing of the operator during the duration of sleep, or the like.

For example, at an operation 510, the communications module 308 can receive the information about the state of the operator. For example, the communications module 308 can receive the information about the state of the operator from one or more of a still image camera, a video camera, an infrared camera, a continuous positive airway pressure (CPAP) machine, or the like. For example, the continuous positive airway pressure (CPAP) machine can be an Internet of things machine.

In a fourth implementation of the disclosed technologies, the method 500 can further include an operation 512. At the operation 512, the model production module 316 can produce the model.

For example, the model production module 316 can be disposed on the vehicle.

Alternatively, for example, the model production module 316 can be disposed on a cloud computing platform.

Additionally or alternatively, for example, the model production module 316 can be disposed with the preferred time gap determination module 306 and the communications module 308.

For example, at the operation 512, the model production module 316 can produce the model by updating the model. For example, at the operation 512, the model production module 316 can update the model continually. Alternatively, for example, at the operation 512, the model production module 316 can update the model in response to an event. For example, the event can include a duration of time at which the vehicle is stationary being greater than a threshold duration of time.

In a fifth implementation of the disclosed technologies, the setting of the cruise control determined by the model can be stored in a database. The setting can be indexed by the identity of the operator. For example, at the operation 502, the preferred time gap determination module 306 can: (1) receive the identity of the operator and (2) retrieve, from the database and based on the identity of the operator, the setting of the cruise control determined by the model.

For example, the database can be disposed on the vehicle.

Alternatively, for example, the database can be disposed on a cloud computing platform.

For example, the setting can be further indexed by one or more of: (1) information about an environment in which the vehicle operated at times that correspond to times of production of the historical distances or (2) information about a state of the operator of the vehicle at the times that correspond to the times of production of the historical distances. For example, at the operation 502, the preferred time gap determination module 306 can further: (1) receive one or more of: (a) information about an environment in which the vehicle is operating or (b) information about a state of the operator and (2) retrieve, from the database and based on the one or more of: (a) the information about the environment in which the vehicle is operating or (b) the information about the state of the operator, the setting of the cruise control determined by the model.

For example, the database can store a plurality of settings for the operator. A first setting, of the plurality of settings, can correspond to a first item of the one or more of: (1) the information about the environment in which the vehicle is operating or (2) the information about the state of the operator. A second setting, of the plurality of settings, can correspond to a second item of the one or more of: (1) the information about the environment in which the vehicle is operating or (2) the information about the state of the operator.

In a sixth implementation of the disclosed technologies, the database can store a plurality of settings for a plurality of operators.

For example, the operators can be assigned to classes. The settings can be indexed by the classes. For example, at the operation 502, the preferred time gap determination module 306 can: (1) receive the identity of the operator, (2) determine, based on the identity of the operator, a class, of the plurality of classes, of the operator, and (3) retrieve, from the database and based on the class, the setting of the cruise control determined by the model.

Additionally or alternatively, for example, the settings can be indexed by identities of the operators. For example, at the operation 502, the preferred time gap determination module 306 can: (1) receive the identity of the operator and (2) retrieve, from the database and based on the identity of the operator, the setting of the cruise control determined by the model. For example, the method 500 can further include operations 514 and 516. At the operation 514, the preferred time gap determination module 306 can retrieve, from the database, at least one other setting, of the plurality of settings, for at least one other operator of the plurality of operators. In FIG. 5B, at the operation 516, the preferred time gap determination module 306 can adjust, based on the at least one other settings, the setting of the cruise control determined by the model.

Returning to FIG. 5A, in a seventh implementation of the disclosed technologies, the method 500 can further include operations 518 and 520. At the operation 518, the communications module 308 can receive, from the cruise control, setting selections associated with predetermined distances to be maintained between the vehicle and the preceding vehicle. In FIG. 5B, at the operation 520, the preferred time gap determination module 306 can adjust the setting of the cruise control determined by the model to match a closest setting selection of the setting selections.

Returning to FIG. 5A, in an eighth implementation of the disclosed technologies, the method 500 can further include the operations 522 and 524. At the operation 522, the communications module 308 can receive, after the cruise control has commenced to operate according to the setting of the cruise control determined by the model, information about an attentive state of the operator. In FIG. 5B, at the operation 524, the preferred time gap determination module 306 can adjust, in response to the information about the attentive state of the operator, the setting of the cruise control determined by the model.

Returning to FIG. 5A, in a ninth implementation of the disclosed technologies, the method 500 can further include the operations 526 and 528. At the operation 526, the preferred rate of acceleration module 322 can determine, based on the model and the identity of the operator of the vehicle, a setting for the cruise control with respect to one or more of a magnitude of a rate of acceleration of the vehicle or a magnitude of a rate of deceleration of the vehicle. In FIG. 5B, at the operation 528, the communications module 308 can cause the cruise control to operate according to the setting for the cruise control with respect to the at the one or more of the magnitude of the rate of acceleration of the vehicle or the magnitude of the rate of deceleration of the vehicle.

Figure 6:
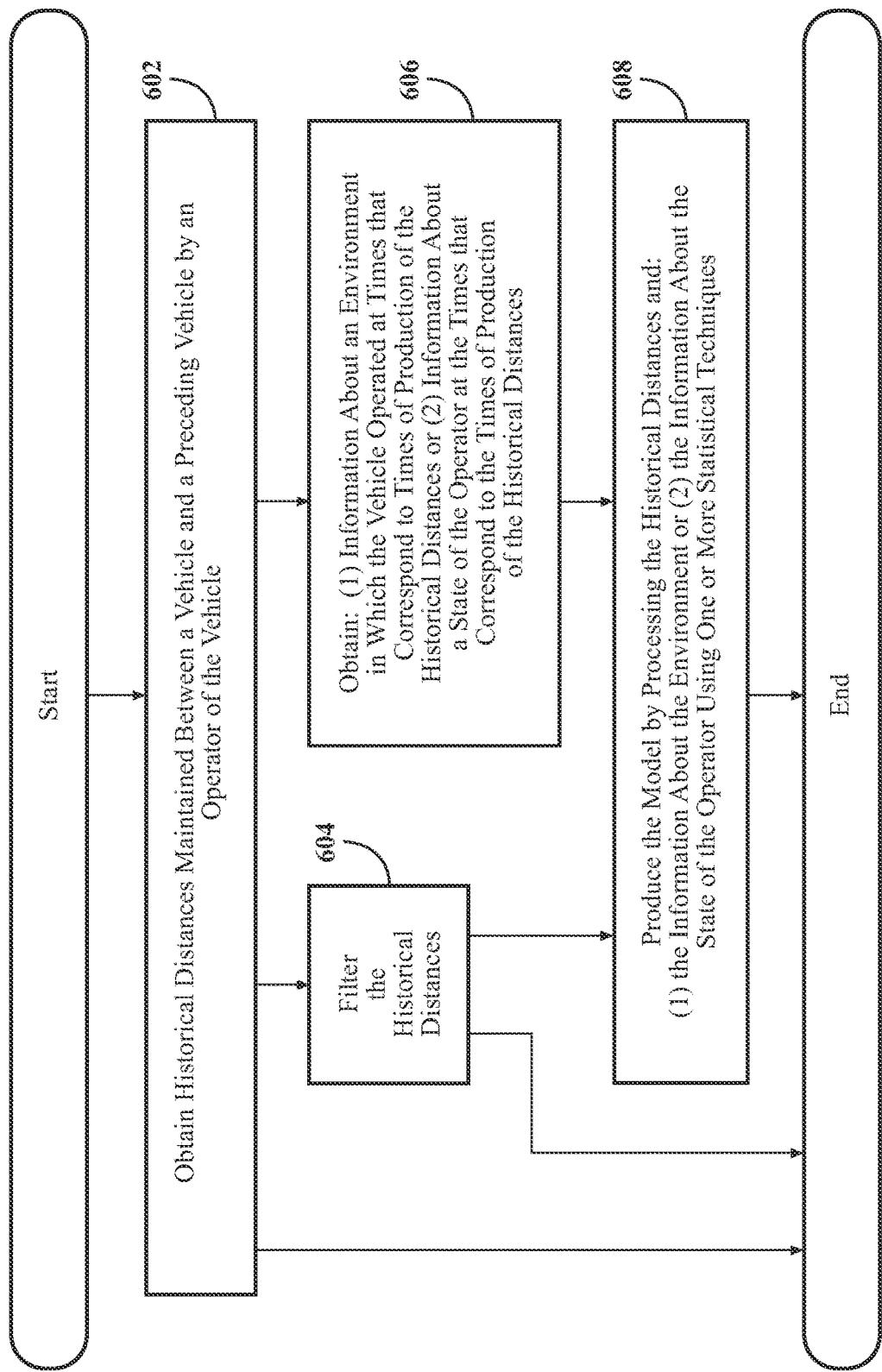
FIG. 6 includes a flow diagram that illustrates an example of a method that is associated with producing a model for determining a setting for a cruise control, according to the disclosed technologies.

FIG. 6 includes a flow diagram that illustrates an example of a method 512 that is associated with producing a model for determining a setting for a cruise control, according to the disclosed technologies. The method 512 is described from the perspective of the system 300 illustrated in FIG. 3. Although the method 512 is described in combination with the system 300, one of skill in the art understands, in light of the description herein, that the method 512 is not limited to being implemented by the system 300. Rather, the system 300 is an example of a system that may be used to implement the method 512.

In FIG. 6, in the method 512, a first configuration of the disclosed technologies can include an operation 602. At the operation 602, the model production module 316 can obtain the historical distances maintained by the operator.

For example, at the operation 602, the model production module 316 can produce the model from a set of the historical distances. For example, the set of the historical distances can be a continual accumulation of the historical distances that are obtained. Alternatively, for example, the set can be of a specific count of a number of instances of a recording of the historical distances. The instances of the recording of the historical distances can be a most recent instances of the recording of the historical distances.

For example, at the operation 602, the model production module 316 can obtain the historical distances one or more of periodically or in response to an event. For example, the historical distances can be obtained periodically every second. Additionally or alternatively, the event can include one or more of a speed of the vehicle being greater than a threshold speed, the operator of the vehicle causing the speed of the vehicle to increase, the operator of the vehicle causing the speed of the vehicle to decrease, the operator of the vehicle causing the cruise control to control the vehicle, at least once during a duration of time of movement of the vehicle from an origination to a destination (e.g., a trip), or the like.

For example, the event can include a first type of event and a second type of event. For example, at the operation 602, the model production module 316 can apply a first weight to the historical distances obtained in response to the first type of event and to apply a second weight to the historical distances obtained in response the second type of event.

For example, at the operation 602, the model production module 316 can obtain the historical distances from one or more of a radar disposed on the vehicle, a lidar disposed on the vehicle, an analysis of a depth image produced by at least one camera disposed on the vehicle, or the like.

A second configuration of the disclosed technologies can include an operation 604. At the operation 604, the model production module 316 can filter the historical distances.

For example, at the operation 604, the model production module 316 can remove, from a set of the historical distances, the historical distances excluded from a subset of the set. The subset can include the historical distances that are less than a threshold distance at times for which an absolute relative velocity between the vehicle and the preceding vehicle is less than a threshold absolute relative velocity for greater than a threshold duration of time. For example, the setting for the cruise control produced by such a model can be a mean of the historical distances included in the subset.

Alternatively, for example, at the operation 604, the model production module 316 can remove, from a set of the historical distances, one or more of the historical distances that are greater than a first threshold distance or the historical distances that are less than a second threshold distance. For example, at the operation 604, the model production module 316 can: (1) determine the first threshold distance to be a distance at a time at which an acceleration of the vehicle is greater than zero and (2) determine the second threshold distance to be a distance at a time at which the acceleration of the vehicle is less than zero. For example, the setting for the cruise control produced by such a model can be a median of the first threshold distance and the second threshold distance.

A third configuration of the disclosed technologies can include operations 606 and 608. At the operation 606, the model production module 316 can obtain one or more of: (1) information about an environment in which the vehicle operated at times that correspond to times of production of the historical distances or (2) information about a state of the operator of the vehicle at the times that correspond to the times of production of the historical distances. At the operation 608, the model production module 316 can produce the model by processing the historical distances and the one or more of: (1) the information about the environment or (2) the information about the state of the operator using one or more of a sample mean technique, a maximum likelihood estimates (MLE) technique, a maximum a posteriori (MAP) estimate technique, a Bayesian inference technique, a partially observable Markov decision process (POMDP) model technique, a long short-term memory (LSTM) neural network architecture, a transfer learning algorithm for a neural network, or the like.

Figure 7:
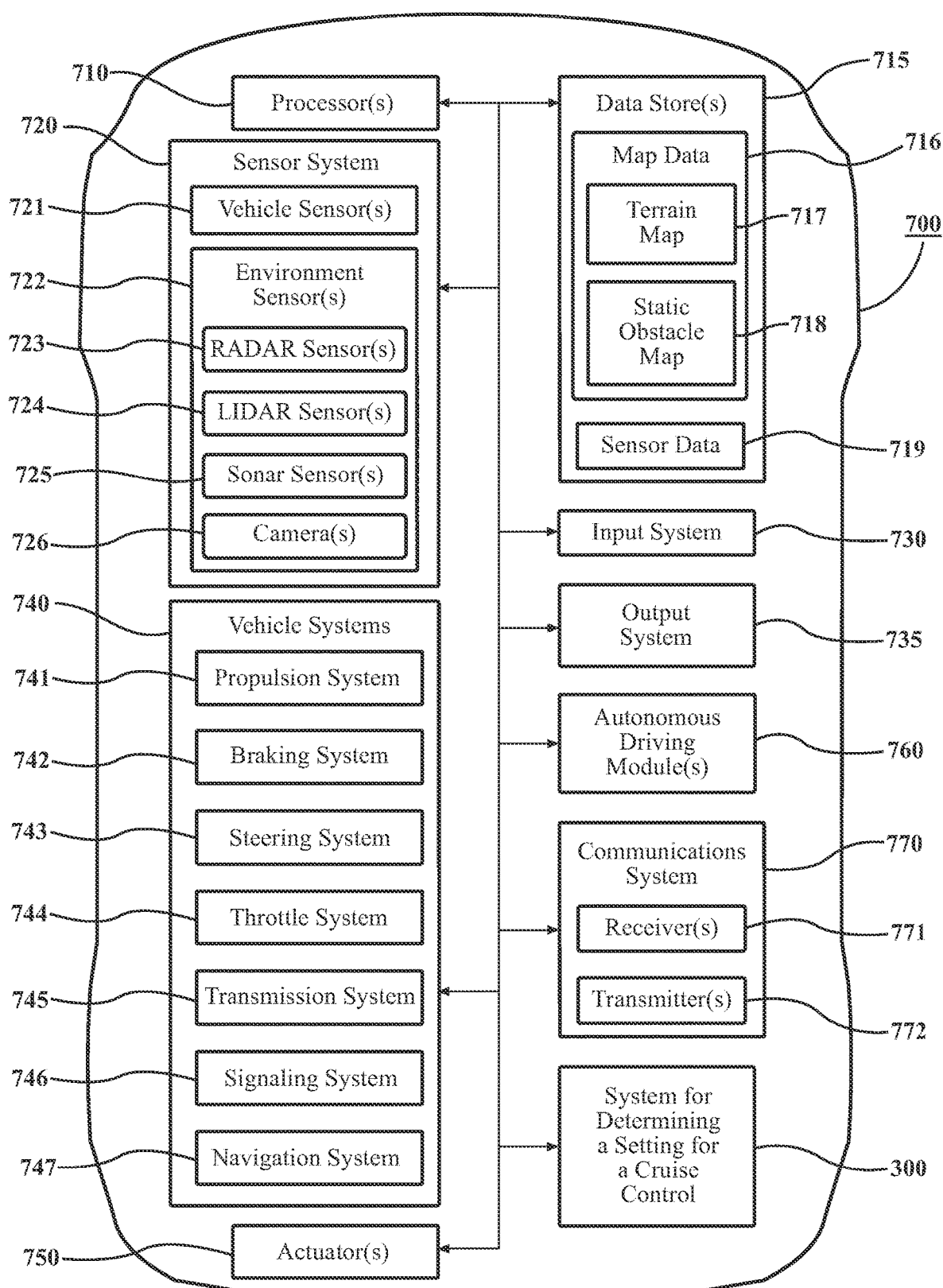
FIG. 7 includes a block diagram that illustrates an example of elements disposed on a vehicle, according to the disclosed technologies.

FIG. 7 includes a block diagram that illustrates an example of elements disposed on a vehicle 700, according to the disclosed technologies. As used herein, a "vehicle" can be any form of powered transport. In one or more implementations, the vehicle 700 can be an automobile. While arrangements described herein are with respect to automobiles, one of skill in the art understands, in light of the description herein, that embodiments are not limited to automobiles.

In some embodiments, the vehicle 700 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 700 is performed according to inputs received from a user (e.g., human driver). In one or more arrangements, the vehicle 700 can be a conventional vehicle that is configured to operate in only a manual mode.

In one or more embodiments, the vehicle 700 can be an automated vehicle. As used herein, "automated vehicle" can refer to a vehicle that operates in an automated mode. As used herein, "automated mode" can refer to navigating and/or maneuvering the vehicle 700 along a travel route using one or more computing systems to control the vehicle 700 with minimal or no input from a human driver. In one or more embodiments, the vehicle 700 can be highly automated or completely automated. In one embodiment, the vehicle 700 can be configured with one or more semi-automated operational modes in which one or more computing systems perform a portion of the navigation and/or maneuvering of the vehicle along a travel route, and a vehicle operator (i.e., driver) provides inputs to the vehicle 700 to perform a portion of the navigation and/or maneuvering of the vehicle 700 along a travel route.

The vehicle 700 can include various elements. The vehicle 700 can have any combination of the various elements illustrated in FIG. 7. In various embodiments, it may not be necessary for the vehicle 700 to include all of the elements illustrated in FIG. 7. Furthermore, the vehicle 700 can have elements in addition to those illustrated in FIG. 7. While the various elements are illustrated in FIG. 7 as being located within the vehicle 700, one or more of these elements can be located external to the vehicle 700. Furthermore, the elements illustrated may be physically separated by large distances. For example, as described, one or more components of the disclosed system can be implemented within the vehicle 700 while other components of the system can be implemented within a cloud-computing environment, as described below. For example, the elements can include one or more processors 710, one or more data stores 715, a sensor system 720, an input system 730, an output system 735, vehicle systems 740, one or more actuators 750, one or more automated driving modules 760, a communications system 770, and the system 300 for determining a setting for a cruise control.

In one or more arrangements, the one or more processors 710 can be a main processor of the vehicle 700. For example, the one or more processors 710 can be an electronic control unit (ECU). For example, functions and/or operations of the first processor 204, the second processor 240, the processor 246 (illustrated in FIG. 2), the first processor 302, the second processor 312, the processor 318 (illustrated in FIG. 3), or any combination thereof can be realized by the one or more processors 710.

The one or more data stores 715 can store, for example, one or more types of data. For example, functions and/or operations of the first memory 206, the second memory 242, the memory 248, the data store 258 (illustrated in FIG. 2), the first memory 304, the second memory 314, the memory 320, the data store 322 (illustrated in FIG. 3), or any combination thereof can be realized by the one or more data stores 715. The one or more data store 715 can include volatile memory and/or non-volatile memory. Examples of suitable memory for the one or more data stores 715 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 715 can be a component of the one or more processors 710. Additionally or alternatively, the one or more data stores 715 can be operatively connected to the one or more processors 710 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 715 can store map data 716. The map data 716 can include maps of one or more geographic areas. In some instances, the map data 716 can include information or data on roads, traffic control devices, road markings, structures, features, and/or landmarks in the one or more geographic areas. The map data 716 can be in any suitable form. In some instances, the map data 716 can include aerial views of an area. In some instances, the map data 716 can include ground views of an area, including 360-degree ground views. The map data 716 can include measurements, dimensions, distances, and/or information for one or more items included in the map data 716 and/or relative to other items included in the map data 716. The map data 716 can include a digital map with information about road geometry. The map data 716 can be high quality and/or highly detailed.

In one or more arrangements, the map data 716 can include one or more terrain maps 717. The one or more terrain maps 717 can include information about the ground, terrain, roads, surfaces, and/or other features of one or more geographic areas. The one or more terrain maps 717 can include elevation data of the one or more geographic areas. The map data 716 can be high quality and/or highly detailed. The one or more terrain maps 717 can define one or more ground surfaces, which can include paved roads, unpaved roads, land, and other things that define a ground surface.

In one or more arrangements, the map data 716 can include one or more static obstacle maps 718. The one or more static obstacle maps 718 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 718 can have location data, size data, dimension data, material data, and/or other data associated with them. The one or more static obstacle maps 718 can include measurements, dimensions, distances, and/or information for one or more static obstacles. The one or more static obstacle maps 718 can be high quality and/or highly detailed. The one or more static obstacle maps 718 can be updated to reflect changes within a mapped area.

In one or more arrangements, the one or more data stores 715 can store sensor data 719. As used herein, "sensor data" can refer to any information about the sensors with which the vehicle 700 can be equipped including the capabilities of and other information about such sensors. The sensor data 719 can relate to one or more sensors of the sensor system 720. For example, in one or more arrangements, the sensor data 719 can include information about one or more lidar sensors 724 of the sensor system 720.

In some arrangements, at least a portion of the map data 716 and/or the sensor data 719 can be located in one or more data stores 715 that are located onboard the vehicle 700. Alternatively or additionally, at least a portion of the map data 716 and/or the sensor data 719 can be located in one or more data stores 715 that are located remotely from the vehicle 700.

The sensor system 720 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 720 includes a plurality of sensors, the sensors can work independently from each other. Alternatively, two or more of the sensors can work in combination with each other. In such a case, the two or more sensors can form a sensor network. The sensor system 720 and/or the one or more sensors can be operatively connected to the one or more processors 710, the one or more data stores 715, and/or another element of the vehicle 700 (including any of the elements illustrated in FIG. 7). The sensor system 720 can acquire data of at least a portion of the external environment of the vehicle 700 (e.g., nearby vehicles). The sensor system 720 can include any suitable type of sensor. Various examples of different types of sensors are described herein. However, one of skill in the art understands that the embodiments are not limited to the particular sensors described herein.

The sensor system 720 can include one or more vehicle sensors 721. The one or more vehicle sensors 721 can detect, determine, and/or sense information about the vehicle 700 itself. In one or more arrangements, the one or more vehicle sensors 721 can be configured to detect and/or sense position and orientation changes of the vehicle 700 such as, for example, based on inertial acceleration. In one or more arrangements, the one or more vehicle sensors 721 can include one or more accelerometers, one or more gyroscopes, an inertial measurement unit (IMU), a dead-reckoning system, a global navigation satellite system (GNSS), a global positioning system (GPS), a navigation system 747, and/or other suitable sensors. The one or more vehicle sensors 721 can be configured to detect and/or sense one or more characteristics of the vehicle 700. In one or more arrangements, the one or more vehicle sensors 721 can include a speedometer to determine a current speed of the vehicle 700.

Alternatively or additionally, the sensor system 720 can include one or more environment sensors 722 configured to acquire and/or sense driving environment data. As used herein, "driving environment data" can include data or information about the external environment in which a vehicle is located or one or more portions thereof. For example, the one or more environment sensors 722 can be configured to detect, quantify, and/or sense obstacles in at least a portion of the external environment of the vehicle 700 and/or information/data about such obstacles. Such obstacles may be stationary objects and/or dynamic objects. The one or more environment sensors 722 can be configured to detect, measure, quantify, and/or sense other things in the external environment of the vehicle 700 such as, for example, lane markers, signs, traffic lights, traffic signs, lane lines, crosswalks, curbs proximate the vehicle 700, off-road objects, etc. For example, functions and/or operations of the fingerprint scanner 222, the temperature sensor 230, or the light sensor 232 (illustrated in FIG. 2) can be realized by the one or more environment sensors 722. Various examples of sensors of the sensor system 720 are described herein. The example sensors may be part of the one or more vehicle sensors 721 and/or the one or more environment sensors 722. However, one of skill in the art understands that the embodiments are not limited to the particular sensors described.

In one or more arrangements, the one or more environment sensors 722 can include one or more radar sensors 723, one or more lidar sensors 724, one or more sonar sensors 725, and/or one more cameras 726. In one or more arrangements, the one or more cameras 726 can be one or more high dynamic range (HDR) cameras or one or more infrared (IR) cameras. For example, the one or more cameras 726 can be used to record a reality of a state of an item of information that can appear in the digital map. For example, functions and/or operations of the radar 252 (illustrated in FIG. 2) can be realized by the one or more radar sensors 723. For example, functions and/or operations of the lidar 254 (illustrated in FIG. 2) can be realized by the one or more lidar sensors 724. For example, functions and/or operations of the camera 220, the forward facing camera 228, the still image camera 234, the video camera 236, the infrared camera 238, the depth camera 256, or any combination of the foregoing (illustrated in FIG. 2) can be realized by the one or more cameras 726.

The input system 730 can include any device, component, system, element, arrangement, or groups thereof that enable information/data to be entered into a machine. The input system 730 can receive an input from a vehicle passenger (e.g., a driver or a passenger). The output system 735 can include any device, component, system, element, arrangement, or groups thereof that enable information/data to be presented to a vehicle passenger (e.g., a driver or a passenger). For example, functions and/or operations of the interface 210 (illustrated in FIG. 2) can be realized by the input system 730.

Various examples of the one or more vehicle systems 740 are illustrated in FIG. 7. However, one of skill in the art understands that the vehicle 700 can include more, fewer, or different vehicle systems. Although particular vehicle systems can be separately defined, each or any of the systems or portions thereof may be otherwise combined or segregated via hardware and/or software within the vehicle 700. For example, the one or more vehicle systems 740 can include a propulsion system 741, a braking system 742, a steering system 743, a throttle system 744, a transmission system 745, a signaling system 746, and/or the navigation system 747. Each of these systems can include one or more devices, components, and/or a combination thereof, now known or later developed. For example, functions and/or operations of the steering wheel 224 (illustrated in FIG. 2) can be realized by the steering system 743. For example, functions and/or operations of the joystick-like control lever 226 (illustrated in FIG. 2) can be realized by the braking system 742, the steering system 743, and the throttle system 744.

The navigation system 747 can include one or more devices, applications, and/or combinations thereof, now known or later developed, configured to determine the geographic location of the vehicle 700 and/or to determine a travel route for the vehicle 700. The navigation system 747 can include one or more mapping applications to determine a travel route for the vehicle 700. The navigation system 747 can include a global positioning system, a local positioning system, a geolocation system, and/or a combination thereof.

The one or more actuators 750 can be any element or combination of elements operable to modify, adjust, and/or alter one or more of the vehicle systems 740 or components thereof responsive to receiving signals or other inputs from the one or more processors 710 and/or the one or more automated driving modules 760. Any suitable actuator can be used. For example, the one or more actuators 750 can include motors, pneumatic actuators, hydraulic pistons, relays, solenoids, and/or piezoelectric actuators.

The one or more processors 710 and/or the one or more automated driving modules 760 can be operatively connected to communicate with the various vehicle systems 740 and/or individual components thereof. For example, the one or more processors 710 and/or the one or more automated driving modules 760 can be in communication to send and/or receive information from the various vehicle systems 740 to control the movement, speed, maneuvering, heading, direction, etc. of the vehicle 700. The one or more processors 710 and/or the one or more automated driving modules 760 may control some or all of these vehicle systems 740 and, thus, may be partially or fully automated.

The one or more processors 710 and/or the one or more automated driving modules 760 may be operable to control the navigation and/or maneuvering of the vehicle 700 by controlling one or more of the vehicle systems 740 and/or components thereof. For example, when operating in an automated mode, the one or more processors 710 and/or the one or more automated driving modules 760 can control the direction and/or speed of the vehicle 700. The one or more processors 710 and/or the one or more automated driving modules 760 can cause the vehicle 700 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 770 can include one or more receivers 771 and/or one or more transmitters 772. The communications system 770 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 770 can include "connected car" technology. "Connected car" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology). "Vehicle to Everything" (V2X) technology can integrate aspects of these individual communications technologies. For example, functions and/or operations of the communications device 140, the communications device 142, the communications device 144 (illustrated in FIG. 1), the first communications device 208, the second communications device 244, the communications device 250 (illustrated in FIG. 2), the communications device 310 (illustrated in FIG. 3), or any combination of the foregoing can be realized by the communications system 770.

The vehicle 700 can include one or more modules, at least some of which are described herein. The modules can be implemented as computer-readable program code that, when executed by the one or more processors 710, implement one or more of the various processes described herein. One or more of the modules can be a component of the one or more processors 710. Alternatively or additionally, one or more of the modules can be executed on and/or distributed among other processing systems to which the one or more processors 710 can be operatively connected. The modules can include instructions (e.g., program logic) executable by the one or more processors 710. Alternatively or additionally, the one or more data store 715 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 700 can include one or more automated driving modules 760. The one or more automated driving modules 760 can be configured to receive data from the sensor system 720 and/or any other type of system capable of capturing information relating to the vehicle 700 and/or the external environment of the vehicle 700. In one or more arrangements, the one or more automated driving modules 760 can use such data to generate one or more driving scene models. The one or more automated driving modules 760 can determine position and velocity of the vehicle 700. The one or more automated driving modules 760 can determine the location of obstacles, obstacles, or other environmental features including traffic signs, trees, shrubs, neighboring vehicles, pedestrians, etc.

The one or more automated driving modules 760 can be configured to receive and/or determine location information for obstacles within the external environment of the vehicle 700 for use by the one or more processors 710 and/or one or more of the modules described herein to estimate position and orientation of the vehicle 700, vehicle position in global coordinates based on signals from a plurality of satellites, or any other data and/or signals that could be used to determine the current state of the vehicle 700 or determine the position of the vehicle 700 with respect to its environment for use in either creating a map or determining the position of the vehicle 700 in respect to map data.

The one or more automated driving modules 760 can be configured to determine one or more travel paths, current automated driving maneuvers for the vehicle 700, future automated driving maneuvers and/or modifications to current automated driving maneuvers based on data acquired by the sensor system 720, driving scene models, and/or data from any other suitable source such as determinations from the sensor data 719. As used herein, "driving maneuver" can refer to one or more actions that affect the movement of a vehicle. Examples of driving maneuvers include: accelerating, decelerating, braking, turning, moving in a lateral direction of the vehicle 700, changing travel lanes, merging into a travel lane, and/or reversing, just to name a few possibilities. The one or more automated driving modules 760 can be configured to implement determined driving maneuvers. The one or more automated driving modules 760 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 760 can be configured to execute various vehicle functions and/or to transmit data to, receive data from, interact with, and/or control the vehicle 700 or one or more systems thereof (e.g., one or more of vehicle systems 740). For example, functions and/or operations of an automotive navigation system can be realized by the one or more automated driving modules 760.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A, 4B, 5A, 5B, 6 and 7, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a first processor; and
a first memory storing:
 a preferred time gap determination module including instructions that when executed by the first processor cause the first processor to:
  determine, based on a model and an identity of an operator of a vehicle, a setting for a cruise control to maintain a time gap between the vehicle and a preceding vehicle, the model based on historical time gaps maintained by the operator; and
  adjust the setting, to produce an adjusted setting, to match a closest setting selection of setting selections associated with predetermined time gaps to be maintained between the vehicle and the preceding vehicle; and
 a communications module including instructions that when executed by the first processor cause the first processor to:
  receive, from the cruise control, the setting selections associated with the predetermined time gaps to be maintained between the vehicle and the preceding vehicle; and
  cause the cruise control to operate according to the adjusted setting.

2. The system of claim 1, further comprising a communications device, wherein the communications module further includes instructions that cause the first processor to receive, via the communications device, the identity of the operator from at least one of an interface configured to receive information associated with the identity, a cloud computing platform, or a biometric system configured to determine the identity.

3. The system of claim 1, wherein the model is further based on information about an environment in which the vehicle is operating, the information about the environment comprising at least one of a weather in a vicinity of the vehicle, a visibility in the vicinity, a temperature in the vicinity, a measure of traffic in the vicinity, a condition of a road in the vicinity, a type of the road, a number of a lane of the road, a type of the lane, a time of day, a type of the preceding vehicle, or a color of the preceding vehicle.

4. The system of claim 3, further comprising a communications device, wherein the communications module further includes instructions that cause the first processor to receive, via the communications device, the information about the environment from at least one of a sensor of the vehicle, a cloud computing platform, or another object in a vicinity of the vehicle.

5. The system of claim 1, wherein the model is further based on information about a state of the operator of the vehicle, the information about the state of the operator comprising at least one of information about an emotional state of the operator, information about an attentive state of the operator, or information about a quality of a duration of sleep of the operator at a time before a current operation of the vehicle.

6. The system of claim 5, wherein the at least one of the information about the emotional state of the operator or the information about the quality of the duration of sleep of the operator at the time before the current operation of the vehicle is derived from at least one of a heart rate of the operator, a measure of a pupil of an eye of the operator, a motion of the operator indicative of a state of surprise, or information about a breathing of the operator during the duration of sleep.

7. The system of claim 5, further comprising a communications device, wherein the communications module further includes instructions that cause the first processor to receive, via the communications device, the information about the state of the operator from at least one of a still image camera, a video camera, an infrared camera, or a continuous positive airway pressure machine.

8. The system of claim 1, further comprising:
a second processor; and
a second memory storing a model production module including instructions that when executed by the second processor cause the second processor to produce the model.

9. The system of claim 8, wherein the instructions to produce the model include instructions to cause the second processor to obtain the historical time gaps maintained by the operator at least one of periodically or in response to an event, the event comprising at least one of a speed of the vehicle being greater than a threshold speed, the operator of the vehicle causing the speed of the vehicle to increase, the operator of the vehicle causing the speed of the vehicle to decrease, the operator of the vehicle causing the cruise control to control the vehicle, or at least once during a duration of time of movement of the vehicle from an origination to a destination.

10. The system of claim 8, wherein the instructions to produce the model further include instructions to cause the second processor to filter the historical time gaps.

11. The system of claim 8, wherein the model production module further includes instructions that when executed by the second processor cause the second processor to obtain at least one of:
information about an environment in which the vehicle operated at times that correspond to times of production of the historical time gaps, or
information about a state of the operator of the vehicle at the times that correspond to the times of production of the historical time gaps.

12. The system of claim 11, wherein the instructions to cause the second processor to produce the model include instructions to cause the second processor to produce the model using at least one of a sample mean technique, a maximum likelihood estimates (MLE) technique, a maximum a posteriori (MAP) estimate technique, a Bayesian inference technique, a partially observable Markov decision process (POMDP) model technique, a long short-term memory (LSTM) neural network architecture, or a transfer learning algorithm for a neural network.

13. The system of claim 1, further comprising a data store configured to store a database, wherein:
the setting is stored in the database, the setting being indexed by the identity of the operator and at least one of:
information about an environment in which the vehicle operated at times that correspond to times of production of the historical time gaps, or
information about a state of the operator of the vehicle at the times that correspond to the times of production of the historical time gaps, and
the instructions to determine the setting for the cruise control include instructions that when executed by the first processor cause the first processor to:
receive the identity of the operator and at least one of information about an environment in which the vehicle is operating or information about a state of the operator; and
retrieve, from the database and based on the identity of the operator and at least one of the information about the environment in which the vehicle is operating or the information about the state of the operator, the setting.

14. The system of claim 1, wherein a rate of energy consumption by the vehicle when the vehicle is controlled by the cruise control is less than the rate of energy consumption when the vehicle lacks being controlled by the cruise control.

15. The system of claim 1, further comprising a data store configured to store a database, wherein the database stores a plurality of settings for a plurality of operators.

16. The system of claim 15, wherein:
the operators are assigned to classes,
the settings are indexed by the classes, and
the instructions to determine the setting for the cruise control include instructions that when executed by the first processor cause the first processor to:
receive the identity of the operator;
determine, based on the identity of the operator, a class, of the plurality of classes, of the operator; and
retrieve, from the database and based on the identity of the operator and the class, the setting.

17. The system of claim 15, wherein:
the settings are indexed by identities of the operators,
the instructions to determine the setting for the cruise control include instructions that when executed by the first processor cause the first processor to:
receive the identity of the operator; and
retrieve, from the database and based on the identity of the operator, the setting, and
the preferred time gap determination module further includes instructions that when executed by the first processor cause the first processor to:
retrieve, from the database, at least one other setting, of the plurality of settings, for at least one other operator of the plurality of operators; and
further adjust, based on the at least one other settings, the adjusted setting to produce a further adjusted setting.

18. The system of claim 17, wherein the at least one other setting is based on at least one of a weather at a time of an instance of a recording of a time gap between at least one other vehicle and at least one other preceding vehicle, a visibility at the time of the instance, a temperature at the time of the instance, a road condition at the time of the instance, a road type at the time of the instance, a lane number at the time of the instance, a lane type at the time of the instance, a preceding type of the at least one other preceding vehicle at the time of the instance, a traffic condition at the time of the instance, an emotional state of the at least one other operator at the time of the instance, an attentive state of the at least one other operator at the time of the instance, a sleep quality of a duration of sleep of the at least one other operator at a time before the time of the instance, or a class to which the at least one other operator has been assigned.

19. The system of claim 17, wherein the further adjusted setting is an average of the setting and the at least one other setting.

20. A method, comprising:
    determining, by a processor and based on a model and an identity of an operator of a vehicle, a setting for a cruise control to maintain a time gap between the vehicle and a preceding vehicle, the model based on historical time gaps maintained by the operator;
    receiving, by the processor and from the cruise control, setting selections associated with predetermined time gaps to be maintained between the vehicle and the preceding vehicle;
    adjusting, by the processor, the setting, to produce an adjusted setting, to match a closest setting selection of the setting selections associated with the predetermined time gaps to be maintained between the vehicle and the preceding vehicle; and
    causing, by the processor, the cruise control to operate according to the adjusted setting.

21. The method of claim 20, further comprising:
    receiving, by the processor after the cruise control has commenced to operate according to the adjusted setting, information about an attentive state of the operator; and
    further adjusting, by the processor and in response to the information about the attentive state of the operator, the adjusted setting.

22. The method of claim 20, further comprising:
    further adjusting, by the processor and based on the model and the identity of the operator of the vehicle, the adjusted setting for the cruise control with respect to at least one of a magnitude of a rate of acceleration of the vehicle or a magnitude of a rate of deceleration of the vehicle.

23. A non-transitory computer-readable medium for determining a setting for a cruise control, the non-transitory computer-readable medium including instructions that when executed by one or more processors cause the one or more processors to:
    determine, based on a model and an identity of an operator of a vehicle, a setting for a cruise control to maintain a time gap between the vehicle and a preceding vehicle, the model based on historical time gaps maintained by the operator;
    receive, from the cruise control, setting selections associated with predetermined time gaps to be maintained between the vehicle and the preceding vehicle;
    adjust the setting, to produce an adjusted setting, to match a closest setting selection of the setting selections associated with the predetermined time gaps to be maintained between the vehicle and the preceding vehicle; and
    cause the cruise control to operate according to the adjusted setting.

* * * * *